(12) United States Patent
Maynard et al.

(10) Patent No.: US 6,626,477 B2
(45) Date of Patent: Sep. 30, 2003

(54) VEHICLE CONVERSION SYSTEM AND METHOD

(75) Inventors: Lyman B. Maynard, Oakville (CA); Tom Forsythe, Mississauga (CA)

(73) Assignee: L & P Property Management Company, South Gate, CA (US)

(*) Notice: Subject to any disclaimer, the term of this patent is extended or adjusted under 35 U.S.C. 154(b) by 73 days.

(21) Appl. No.: 09/756,557

(22) Filed: Jan. 8, 2001

(65) Prior Publication Data

US 2001/0023786 A1 Sep. 27, 2001

Related U.S. Application Data

(60) Provisional application No. 60/174,754, filed on Jan. 6, 2000.

(51) Int. Cl.[7] .............................. B60N 2/00; H04B 1/00; B60Q 1/00
(52) U.S. Cl. .................. 296/24.1; 296/37.16; 296/37.2; 296/208; 381/86; 307/10.8; 340/471
(58) Field of Search .............................. 296/24.1, 37.16, 296/37.1, 37.2, 208; 381/86; 307/9.1, 10.1, 10.8; 340/471, 472, 468, 425.5

(56) References Cited

U.S. PATENT DOCUMENTS

| | | | |
|---|---|---|---|
| 2,547,083 A | * | 4/1951 | Lundgren |
| 3,569,788 A | | 3/1971 | Niblack |
| 3,727,813 A | | 4/1973 | Eby |
| 3,756,677 A | | 9/1973 | Gosswiller |
| 3,984,161 A | | 10/1976 | Johnson |
| 4,241,870 A | | 12/1980 | Marcus |
| 4,270,790 A | * | 6/1981 | Curotto .................. 296/37.16 |
| 4,733,901 A | | 3/1988 | Okuyama |
| 4,799,849 A | * | 1/1989 | Miller .................. 296/37.1 X |
| 4,818,010 A | | 4/1989 | Dillion |
| 4,878,706 A | * | 11/1989 | Novifov .................. 296/37.1 |
| 4,936,531 A | | 6/1990 | Bauser |
| 4,964,666 A | | 10/1990 | Dillion |
| 5,025,964 A | * | 6/1991 | Phirippidis ............. 296/37.1 X |
| 5,106,143 A | | 4/1992 | Soeters |
| 5,154,617 A | | 10/1992 | Suman et al. |
| 5,179,503 A | | 1/1993 | Fouts et al. |
| 5,199,772 A | | 4/1993 | Jordan |
| 5,246,261 A | | 9/1993 | McCormack |
| 5,301,992 A | * | 4/1994 | Whitmore .................. 296/37.1 |
| 5,345,218 A | | 9/1994 | Woods et al. |
| 5,434,553 A | | 7/1995 | Rhodes |
| 5,499,009 A | | 3/1996 | Davis |
| 5,511,842 A | | 4/1996 | Dillion |
| 5,536,057 A | * | 7/1996 | Stewart ..................... 296/24.1 |
| 5,585,782 A | | 12/1996 | Yosko |
| 5,625,257 A | | 4/1997 | Nunn |
| 5,626,380 A | * | 5/1997 | Elson et al. ........... 296/37.1 X |
| 5,632,462 A | | 5/1997 | Kallas |
| 5,644,290 A | | 7/1997 | Rhodes |
| 5,659,289 A | | 8/1997 | Zonkoski et al. |
| 5,703,411 A | | 12/1997 | Bella et al. |
| 5,754,664 A | * | 5/1998 | Clark et al. .................. 381/86 |
| 5,770,999 A | | 6/1998 | Rhodes |
| 5,799,850 A | | 9/1998 | Ryder |
| 5,912,511 A | | 6/1999 | Hidaka |
| 5,949,148 A | | 9/1999 | Wagner |
| 5,971,799 A | | 10/1999 | Swade |
| 6,005,300 A | | 12/1999 | Kelly |
| 6,018,201 A | | 1/2000 | Mauney et al. |
| 6,142,556 A | | 11/2000 | Tanaka et al. |
| 6,166,453 A | | 12/2000 | Kon'i et al. |

\* cited by examiner

*Primary Examiner*—Joseph D. Pape
(74) *Attorney, Agent, or Firm*—Hahn Loeser & Parks LLP; Michael H. Munns

(57) ABSTRACT

The invention relates to a conversion system and method of converting a vehicle into a police car or similar emergency vehicle in a manner which is easily installed and removed and designed so that it causes no damage to the vehicle, thereby improving the resale value of the vehicle upon termination of the lease or retirement of the vehicle from service.

52 Claims, 25 Drawing Sheets

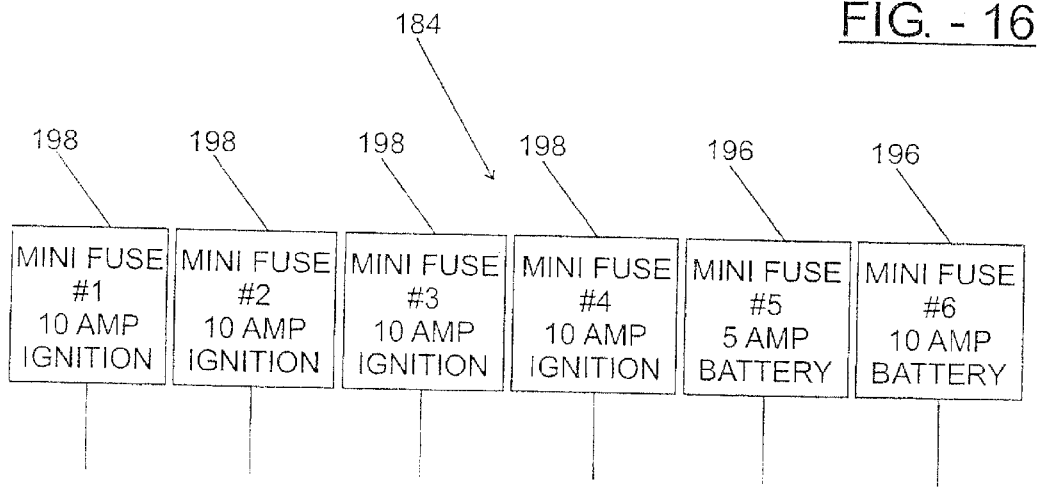
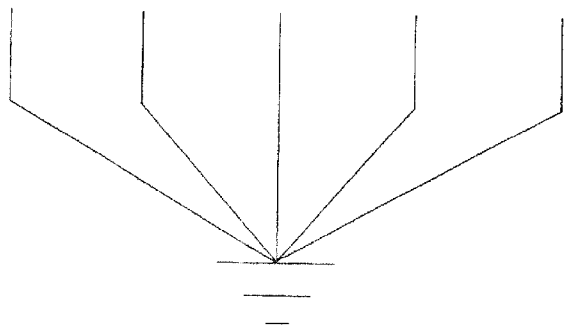
FIG. - 16
USED WITH
VISIBILITY
PACKAGE
OPTION
GROUND
SOURCE AT
GLOVE BOX
FUSE / RELAY
BLOCK
USE GROUND(S) PROVIDED, ONE WITH EACH POWER SOURCE FIG. - 21
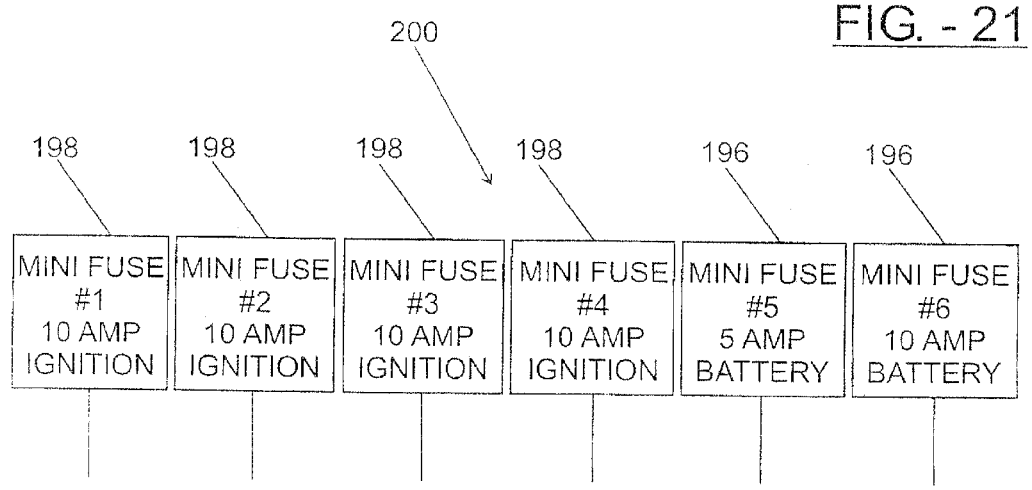
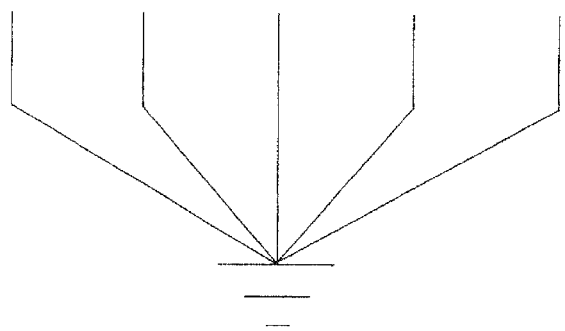
GROUND
SOURCE AT
TRUNK TRAY
FUSE / RELAY
BLOCK
USE GROUND(S) PROVIDED, ONE WITH EACH POWER SOURCE

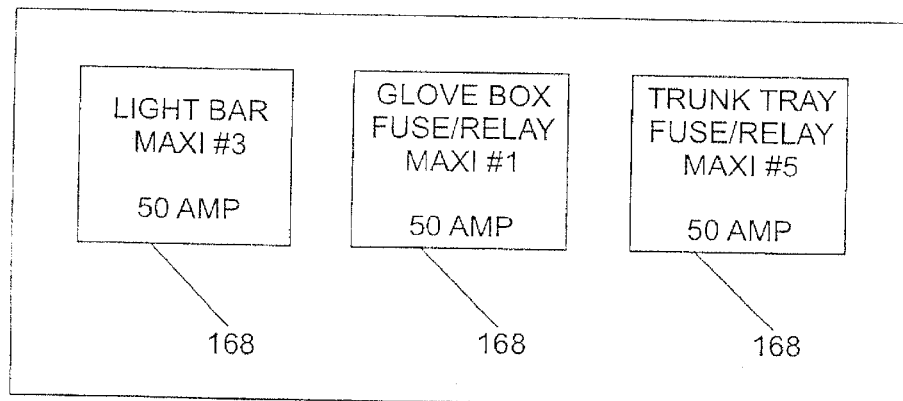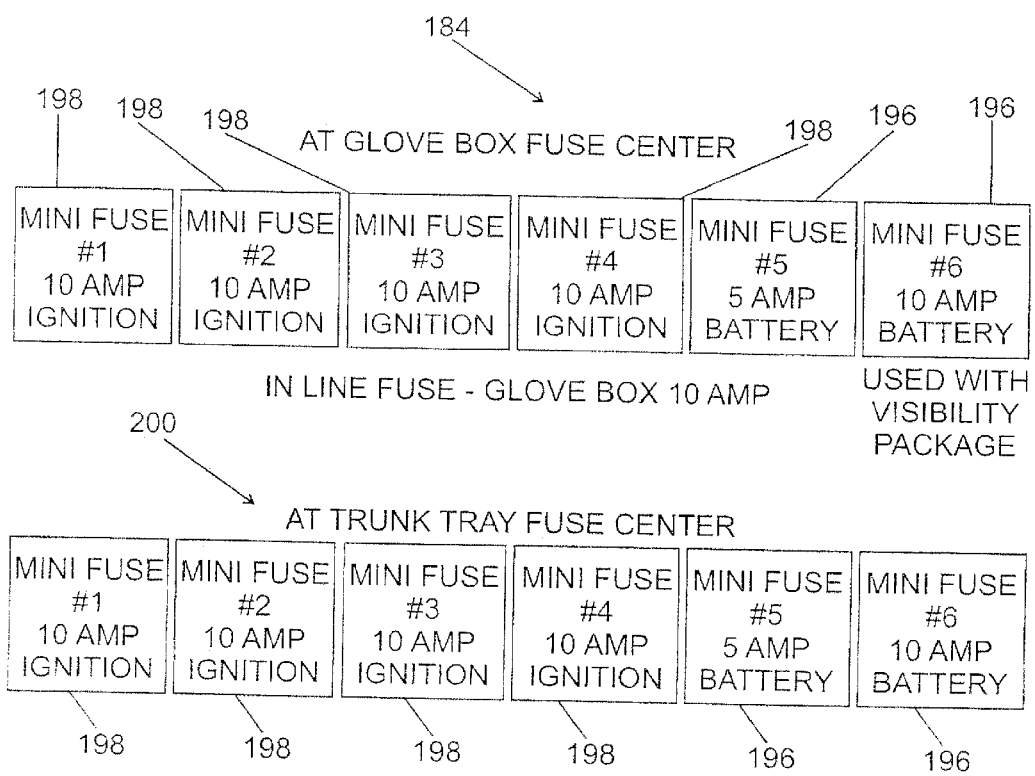
FIG. - 22

VEHICLE CONVERSION SYSTEM AND METHOD

This application is based on U.S. Provisional Patent Application Serial No. 60/174,754 filed on Jan. 6, 2000.

The present invention relates to the conversion of a vehicle for a special purpose, such as with a police car or similar emergency vehicle, taxi or the like. More specifically, the invention relates to a conversion system and method of converting a vehicle in a manner which allows specialized equipment to be easily installed and removed and without causing permanent damage or alteration of the vehicle, thereby enabling such a vehicle to be leased and improving the resale value of the vehicle upon termination of the lease or retirement of the vehicle from special service.

BACKGROUND

A wide variety of vehicles must be converted for a special use, such as police and emergency vehicles. Police vehicles are a familiar sight to virtually all people through the United States and other industrialized nations. Police cars in particular have become extremely familiar and visible as they patrol various areas through the country. In addition to the typical police car, other agencies having somewhat similar functions and needs often maintain police car type vehicles in a patrol function. Other vehicles such as emergency vehicles including firefighting vehicles and equipment as well as ambulances and even taxis must be converted in various ways for their particular function. Such vehicles in many cases utilize many similar systems to one another, and may have similar conversion requirements.

In practice, police agencies and other similar agencies produce patrol cars by converting more or less standard automobiles to patrol cars in a process best described as custom installation of the emergency and police equipment. This process has proven to be time consuming and costly and requires significant capital. In addition, the creation of custom installations for each patrol car renders the maintenance process more costly and difficult, thereby increasing capitol requirements and operational and maintenance costs of their fleets, it would be advantageous if departments and agencies could lease their vehicles. Finance companies or other entities are unwilling or reluctant to lease vehicles for such special purposes, or lease rates are increased dramatically, due to the custom conversion for the desired purpose. Before this invention, such custom conversion causes permanent damage and alteration of the vehicle. Due to such alterations, the vehicles are substantially devalued for subsequent lease or sale to typical consumers.

Extensive modifications are required in order to convert a standard vehicle into a police car or similar emergency vehicle. In today's high technology world, an assortment of equipment must be installed to meet the in-service needs and requirements of the users. This equipment may include video cameras and recorders, radios, sirens, scanners, computers, printers, radar guns, light bars or other lighting units, antennas, control panels, electronic readouts, cellular phones, equipment compartments, weapon racks, officer protection barriers, and various other accessories. All of this equipment must somehow be mounted in the vehicle in a manner which is convenient to the person operating the vehicle without reducing driver comfort or safety. While many of these devices are mounted on or associated with the vehicle frame or dashboard, additional steel brackets, posts, flanges and adapters are employed for mounting of such equipment. The mounting hardware permanently defaces the vehicles when the equipment is removed, resulting in the substantial devaluing of the vehicle. In addition, many of these devices require running of special wiring for delivery of power and for communication purposes. The additional wiring is typically spliced into the existing—OEM wiring of the vehicle when the new system is attached. This may result in overloading the existing wiring structure or cause other electrical problems after installation or when the additional wiring is removed. The significant changes and modifications of the vehicle typically performed which also usually result in the voiding of the vehicle warranty.

Another concern is the passenger area of the vehicle, such as the rear seat area. This area often must be cleaned for sanitary reasons. The repetitive cleaning of these areas will increase the downtime of the vehicle and result in excessive wear and tear, thus decreasing the vehicle resale value.

These factors provide a dilemma to the fleet manager or the like whose task it is to provide the appropriately equipped vehicles for a department or agency at a minimum cost, minimal maintenance and minimal vehicle downtime for conversion and equipment installation. As a consequence, there remains a need for a simple and cost effective conversion system and method for mounting the conversion equipment required in a vehicle, while not permanently damaging or altering the vehicle. Further, there is a need for a conversion system and method which allows problems associated with custom conversions to be overcome.

SUMMARY

Based upon the foregoing, it is therefore an object of the present invention to provide a conversion system and method for converting a vehicle in a manner which maintains the integrity of the vehicle and particularly of the original equipment manufacturer's electrical system and housings. The system can be easily installed and removed and does not deface the vehicle surfaces, thereby retaining the value for subsequent lease or resale of the vehicle, and reducing the total cost of operation of the vehicle as well. The system and method further eliminates voiding the warranty issues resulting from permanent alterations to the vehicle.

It is another object of the present invention to provide a simplified and cost-effective conversion system and method for converting a vehicle into a police car or similar emergency vehicle using standardized parts which are easily installed, removed and reused in other like-vehicle models.

It is a further object of the present invention to provide a conversion system and methods which supports and facilitates receipt of a wide variety of special purpose equipment, but does not limit vehicle performance, drive comfort, efficiency, and safety, and also enhances the roominess and storage capacity of the vehicle.

The invention disclosed and described herein provides a conversion system and method for converting a vehicle comprising an independent wiring harness, conduit/console assembly, light bar mount, trunk storage and communication area, strobe system, rear strobe deck lights or other equipment. For vehicles converted for use for transporting detainees, a custom barrier and rear seat and floor replacement module are available in the conversion. The system elements are designed of standard parts to be easily installed and removed from the vehicle. The elements are attached to the vehicle in a manner not damaging or defacing to the vehicle surfaces.

These and other objects and advantages of the present invention will become apparent from a reading of the attached specification and appended claims.

BRIEF DESCRIPTION OF THE DRAWINGS

FIG. 16 is a simplified schematic of the ignition and battery power fuses of the glove box fuse/relay center.

FIG. 21 is a simplified schematic of the ignition and battery power from the fuses of the trunk fuse/relay center.

FIG. 22 is a simplified schematic of the location of the various fuses in the independent wiring harness.

DESCRIPTION

Figure 1:
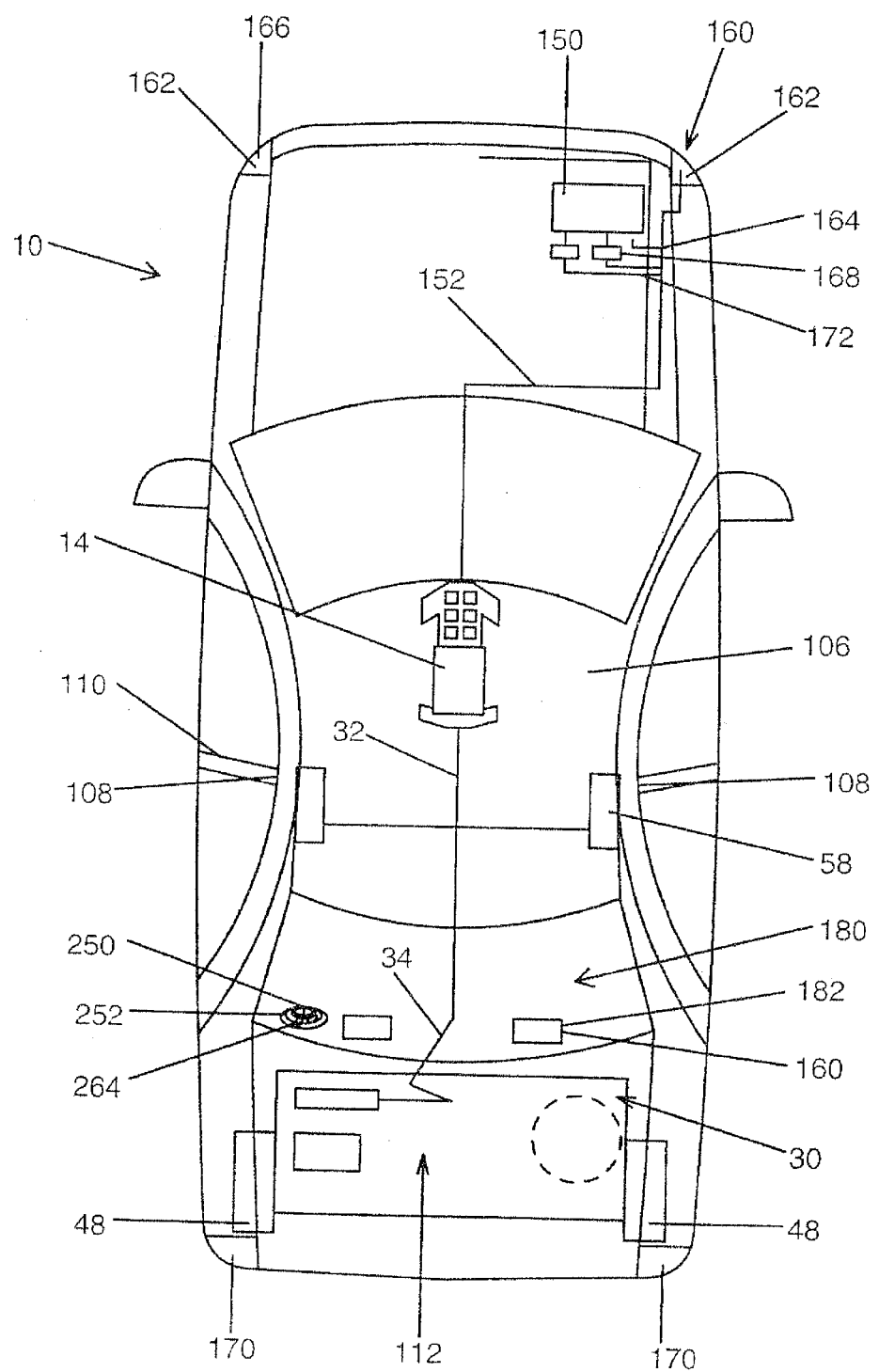
FIG. 1 is a schematic top view of one embodiment of the present invention.

Turning now to the Figures, one embodiment of the invention is shown in conjunction with a standard vehicle 10, such as a four-door sedan, wherein the conversion system provides desired functionality for use of the vehicle as an emergency or other special purpose vehicle. Referring now to FIG. 1, the vehicle 10 is shown to be converted for use as a police vehicle, wherein the conversion system according to the invention allows modification of the standard vehicle 10 to this specialized purpose without permanent alteration of the visible surfaces of standard vehicle 10, which would devalue the vehicle for subsequent use. In general, the conversion system according to the present invention to allow conversion of a vehicle to a police vehicle could include a variety of elements depending upon the needs of the user. In the embodiment as shown in FIG. 1, the conversion system may include a console assembly 14 which allows mounting of accessories as will be hereinafter described in more detail. Further, as various special purpose vehicles require the addition of electronic and communications equipment mounted adjacent the driver or in other locations in the vehicle, an independent wiring harness 152 allows for such adaptation without interference with the wiring in the standard vehicle 10. In this manner, any potential problems, which could be created upon tapping into the existing wiring scheme of vehicle 10, are avoided. The independent wiring harness 152 may be configured to extend through a conduit 32 in the passenger area of the vehicle to protect the harness and occupants, which will be described in more detail hereafter. The wiring harness 152 may thus be coupled to equipment positioned at various locations about the vehicle 10, again without permanent alteration of the original vehicle 10 or wiring scheme provided therein. In one embodiment, a trunk system 30 may be provided to allow positioning of additional equipment or supplies in the trunk area of the vehicle 10, with power supplied to any such equipment via independent wiring harness 152 accessed by means of the conduit 32 which extends to the trunk region. A pivotable wire suspension arm 34 may be provided to allow the wire harness 152 to travel without interference. The trunk system 30 may further include integrated storage boxes generally indicated at 48, as well as other integrated structures to facilitate use for a particular purpose. Another optional feature of the converted vehicle shown in FIG. 1 for a desired special purpose, a barrier system generally indicated at 58 is provided to separate the forward and rear portions of vehicle 10 as in a typical police vehicle. The barrier system 58 again is installed securely without permanent alteration of the vehicle 10, by means of integral brackets designed to couple into existing structures on or adjacent the floor or sides of the vehicle. Alternatively, separate mounting brackets may be used to attach other types of barriers.

Additional equipment which may be provided in conjunction with a police vehicle as shown in FIG. 1 may include a rear deck strobe light/flasher system 160 or other light system mounted in the rear compartment of the vehicle adjacent the rear window at the parcel shelf 112 or other location. A strobe mounting plate and cover may be mounted to existing attachment locations to facilitate this. Each of these systems as well as other details of the preferred embodiment will be understood as the description proceeds.

Figure 2:
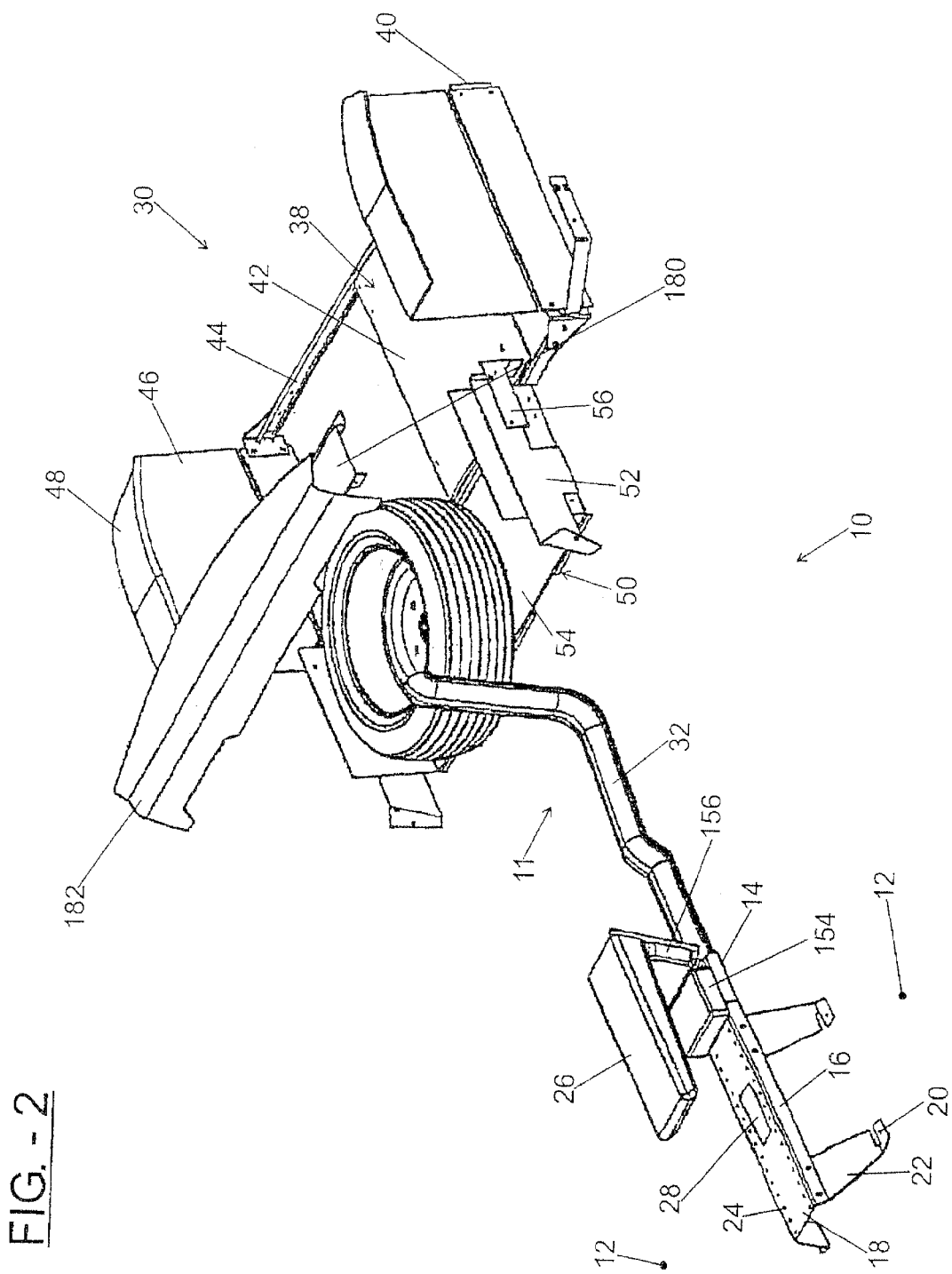
FIG. 2 is a perspective view of the conduit/console assembly and trunk elements of the present invention.

Turning to FIG. 2, the console assembly 14 as well as trunk system 30 is shown in more detail. The console assembly 14 is adapted to be mounted between the front seats 12 (location only shown) of the vehicle 10. This is an area which is easily accessible to the driver and as such is the perfect location for communications equipment. The console assembly 14 preferably comprises a console 16 having a base plate 18 and mounting legs 22. The console assembly 14 attaches to the vehicle 10 at existing mounting points, such as the standard vehicle seat mounts (not shown), through apertures 20 at the ends of the mounting legs 22. This allows the console assembly 14 to be securely attached to the vehicle without requiring the addition of brackets, which may deface the vehicle. The base plate 18 is preferably formed with a series of apertures 24 to allow various equipment to be attached thereto. An armrest 26 is preferably integral with and attached to the console 16 at an end of the base plate 18. The armrest 26 is preferably constructed of steel with a rubberized surface for long term durability. The armrest 26 is also preferably hinged so it can be flipped up for easy access to the console 16 and equipment mounted thereon. An aperture 28 through the center of the base plate 18 allows for access to the preferred independent wiring harness 152 of the conversion system. The independent wiring harness 152 is separate from the original equipment wiring of the vehicle 10 and is directly connected to the battery 150 of the vehicle 10, and preferably with a positive ground. The independent wiring harness 152 is used to provide power to all of the ancillary emergency vehicle add-on components (not shown) such as video cameras and recorders, radios, sirens, scanners, computers, printers, radar guns, lighting units, antennas, control panels, electronics readouts, cellular phones, equipment compartments, gun locks, and various other accessories. No splicing into the original equipment wiring harness is required. The various wires of the harness 152 are connected to fuse boxes 184, 200 which may be attached to the console 16 for easy access or positioned at another location in relation to the wiring harness 152. As shown in FIG. 1, the wiring harness 152 may be operatively connected to the battery 150 of the vehicle, and may conveniently couple power to strobe bulbs 162 in the front parking leses and rear strobe bulbs 170 of the vehicle 10. The harness 152 may also include a siren wire pre-run at 164, isolating fuses 168 associated with the power and ground wires, and prewired strobe conductor cables.

The conduit/console assembly 14 also preferably comprises a conduit 32 associated with the console 16 an extending rearwardly from the console 16 to the trunk system 30. The conduit 32 may be supported on the bottom floor of the vehicle interior and extend under a rear seat module (to be described hereafter) and to a position behind the rear seats to the trunk access opening provided in standard vehicle 10. In this manner, the independent wiring harness 152 extends rearward to the trunk system 30 through the conduit 32 with various hook-up points for easy component installation. Additionally, at a point adjacent the trunk of the vehicle, the wiring harness may be supported by a pivotable suspension arm 34 as shown in FIG. 1, to avoid interference with equipment or access to the trunk region. The conduit 32 may consist of two separate, side by side, channels (not shown), one for the wiring harness 152 and the other as an extra channel for additional wires for future needs. Alternatively, one of the separate channels could be selectively coupled to the air handling or circulation system of vehicle 10 to allow climate control in the trunk area. This may be particularly important if electrical equipment is positioned in the trunk. The conduit/console assembly 14 and the independent wiring harness 152 can be easily disconnected and removed without damage to the vehicle 10.

The vehicle conversion system may also comprise a trunk system 30. The trunk system preferably includes an air circulation system 250 (shown in FIG. 1), for circulating heating or cooling air to the trunk region to maintain a desired environment for equipment positioned in the trunk. A lower trunk assembly 38 may comprise a drop-in frame 40 which is supported by the interior walls and the bottom of the standard trunk such that the lower trunk assembly 38 is securely positioned without being fixably attached to the vehicle 10 with brackets. A support or tray 42 may be provided, which in the preferred embodiment is slidable laterally along tracks 44 attached to opposite sides of the frame 40 to enable access to tools or a spare tire stored beneath the tray 42. The sides 46 of the lower trunk assembly 38 may include integrated side storage boxes 48 for additional storage space. The upper trunk assembly 50 comprises a frame 52 which is preferably fixably attached to the uprights of the trunk lid mechanism such that when the upper trunk assembly 50 is removed, there will be no defacement of the vehicle evident. The upper trunk assembly 50 may comprise a slide tray 54 which can slide in and out on tracks 56 connected to the frame 52 for easy servicing of equipment or access to equipment mounted in conjunction with the lower or upper trunk assemblies in the trunk. It is contemplated that the tray be used for the spare tire, computers or other equipment.

The use of a trunk system may require that the trunk assemblies be configured to not impede the function of the trunk to form a crumple zone in case of accident. The trunk assembly or assemblies and components thereof are therefore preferably designed to crumple in a manner similar to the trunk region, and more specifically, the frames 40 and 52, the trays or supports 42 and 54 and the like, are designed to crumple in a manner to not impede the function of this crumple zone in the vehicle.

The air circulation system 250 may comprise at least one fan 252, which may be mounted in the existing speaker housings 264 or otherwise mounted. The fan 252 may be configured to pull air from the vehicle interior to the trunk. The air circulation system 250 will ensure that any communications equipment in the trunk does not overheat by circulating cool air from the air conditioned vehicle interior. In cold conditions the fans 252 prevent condensation by circulating warm air from the heated vehicle interior. Again, the conduit 32 could also provide air circulation to the trunk area if desired.

Figure 3A:
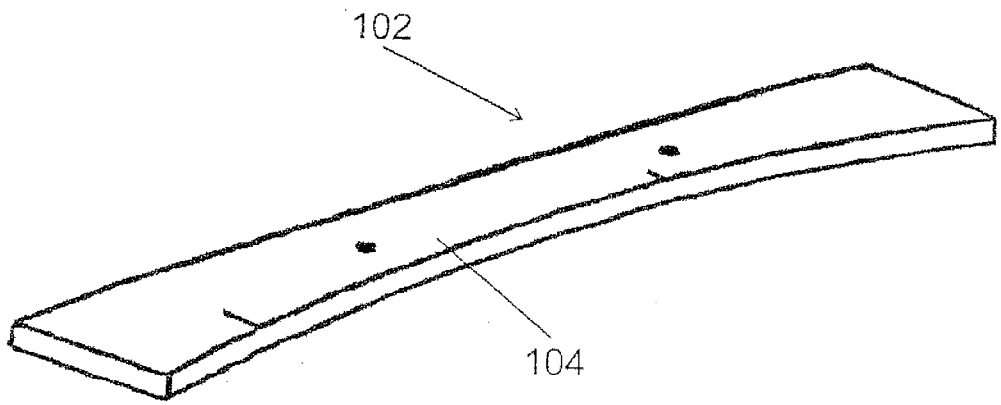
FIGS. 3A and 3B are perspective and side views of the roof mounting system and base plate for mounting equipment of the present invention.
Figure 3B:
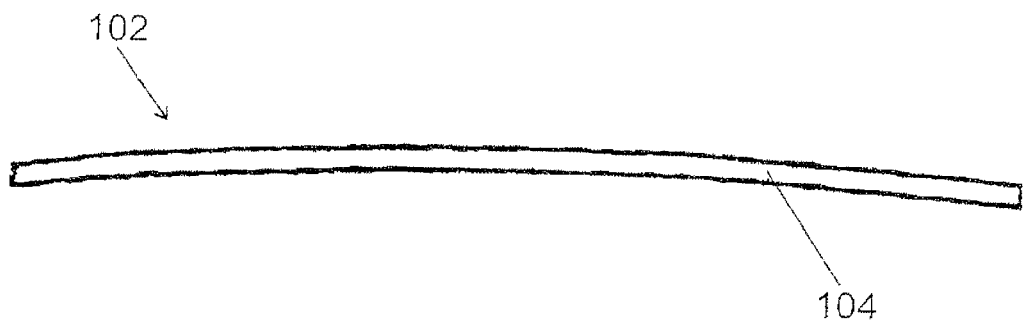

The emergency vehicle conversion system may also comprise an exterior mounting system 102 for lights, spotlights, antennas, radar, video cameras or other accessories or equipment. FIGS. 3A and 3B shows a roof mounting system 102. A standard accessory (not shown) is attached to a base plate 104 of system 102. The base plate 104 is preferably made of aluminum or a molded composite material with a metallic channel or sheet material molded integrally therewith for electrical grounding purposes. Providing an electrical ground in conjunction with plate 104 simplifies hook up of electrical equipment in the system 102 without requiring holes to be drilled in the vehicle to provide grounding. The base plate 104 is preferably configured with a curved shape to match the roof configuration of vehicle 10 and conform to the curvature of the roof. The base plate 104 to be mounted on the roof, spans the vehicle roof exterior 106. Alternatively, the base plate 104 could be dimensioned to mount on the exterior of the trunk, quarter panel or other exterior location. The edges of the base plate 104 may be attached to the roof of vehicle 10, in association with the standard drip molding or otherwise if no drip molding is present, on either side using brackets or other suitable fasteners (not shown) which do not require alteration of the vehicle 10. Any wiring for the accessory equipment may be connected to wiring harness 152 and extends through an aperture 108 (shown in FIG. 1) in the exterior surface of one or both of the B pillars 110 of the vehicle 10, and up and around the edge of the roof to the base plate 104. Additional base plates 104 could also be used to mount other equipment, as segregation of the equipment may be necessary to prevent radio interference. It should also be recognized that other exterior mounting locations could be accommodated with appropriate fastening systems. The accessory device is attached to the vehicle exterior without defacing any of the visible surfaces by means of system 102. The aperture 108 which may be formed in the B pillar may be finished with a rubber grommet when the wiring is removed, leaving the vehicle 10 substantially as originally manufactured. It should also be apparent that a similar base plate mounting system may be used for mounting of other equipment in special purpose vehicle, such as a roof mounted light standard typically on taxi cabs, or other equipment for special purpose vehicles.

A strobe system 160 comprising additional front strobe bulbs 162 positioned in the parking light lens 166, may be connected to the wiring harness 152. Rear deck strobe lights 258 may be mounted on the on the rear deck of the passenger compartment, and rear strobe lights 170 positioned in the rear turn signals. The rear deck strobe lights 258 are secured to a strobe mounting plate 180, which is mounted on an existing attachment area such as the rear parcel shelf 112 in vehicle 10. The lights are protected from the interior of the vehicle by a rear strobe cover 182 which also prevents light flash back toward the interior of the vehicle.

Figure 4:
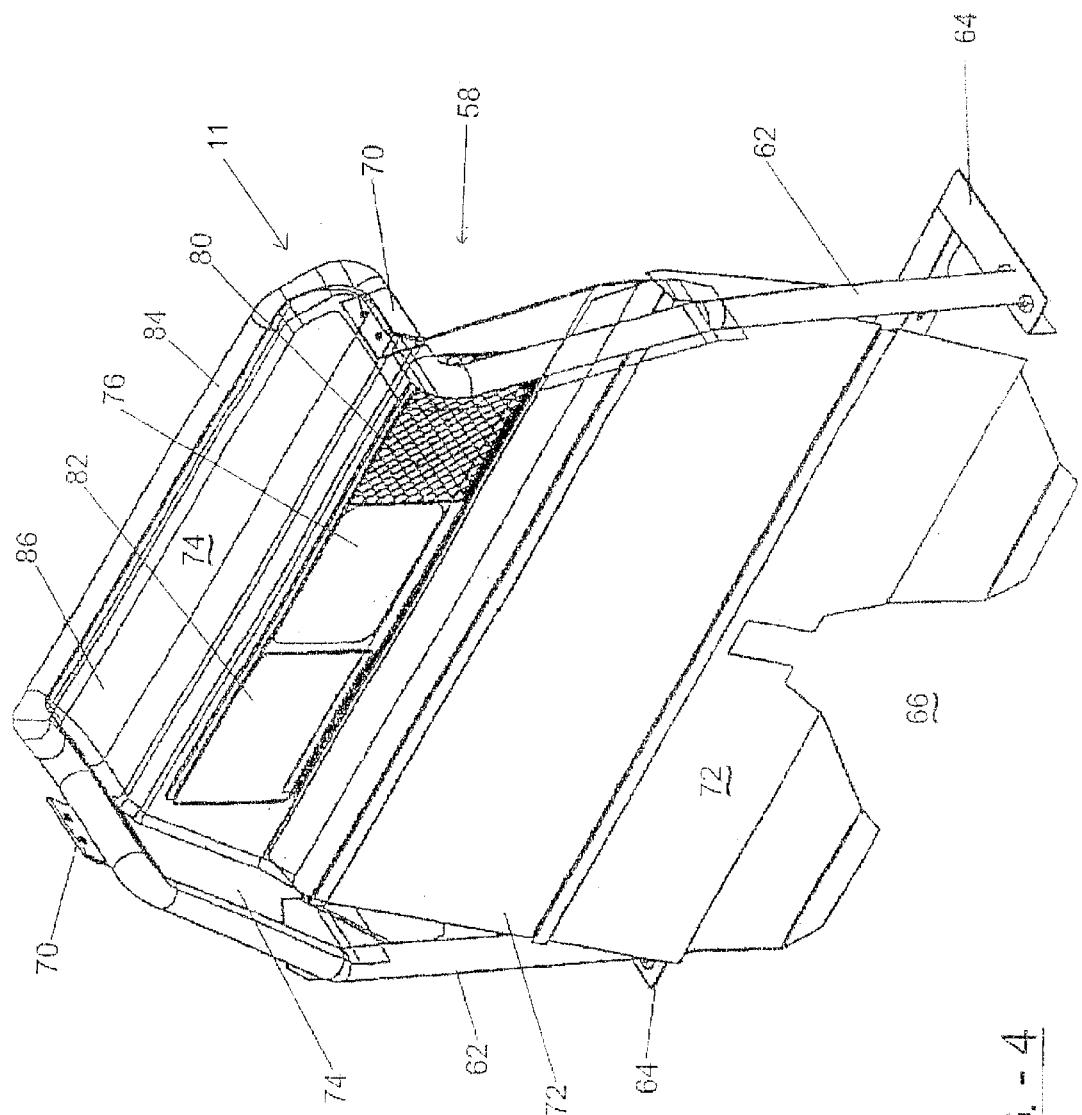
FIG. 4 is a perspective view of the barrier including shelf and gun lock system of an alternate embodiment of the present invention.

When the emergency vehicle is to be used for transportation of detainees, a barrier may be included in the vehicle conversion system as indicated in FIG. 4. A barrier 58 is installed behind the front seats 12 in order to separate the front seating cabin from the rear seating cabin of the vehicle 10. The barrier 58 comprises in the preferred embodiment a tubular steel frame member 62 attached at both ends to reinforced floor base plates 64 which are bolted into the floor 66 of the vehicle 10 at standard sites in the original vehicle. The barrier 58 may be secured to the roof 106 of the vehicle 10 through attachment plates 70 are used to secure the top of the barrier 58 to the roof. Integrated or separate brackets may be used to connect any style of barrier at the top, bottom and/or sides of the vehicle, to secure the barrier 58 in the desired position, using existing mounting holes on the vehicle. In the preferred embodiment, the bottom half 72 of the barrier 58 is preferably made of sheet material. The barrier may be made of a custom-formed composite material or other lightweight sheet material. The top half 74 of the barrier 58 is preferably made of a see through material such as a vacuum formed Lexan® polycarbonate resin sheet material. A window aperture 76 may be cut into the center of the top half 74 of the barrier 58. The window aperture 76 can be closed by sliding an attached screen 80 over the window aperture 76 or by sliding an attached clear window 82 over the window aperture 76. A top portion 84 of the frame member 62 is offset from the rest of the barrier 58 and defines a shelf 86 accessible from the front cabin only. The shelf 86 may be used to store a weapon such as a shotgun or rifle. The weapon is secured on the shelf by a gun lock of a known design. The shelf allows the weapon to be stored out of the way of safety devices such as air bags and provides additional room for other equipment and does not impede upon the passengers in the front of the vehicle.

Figure 5:
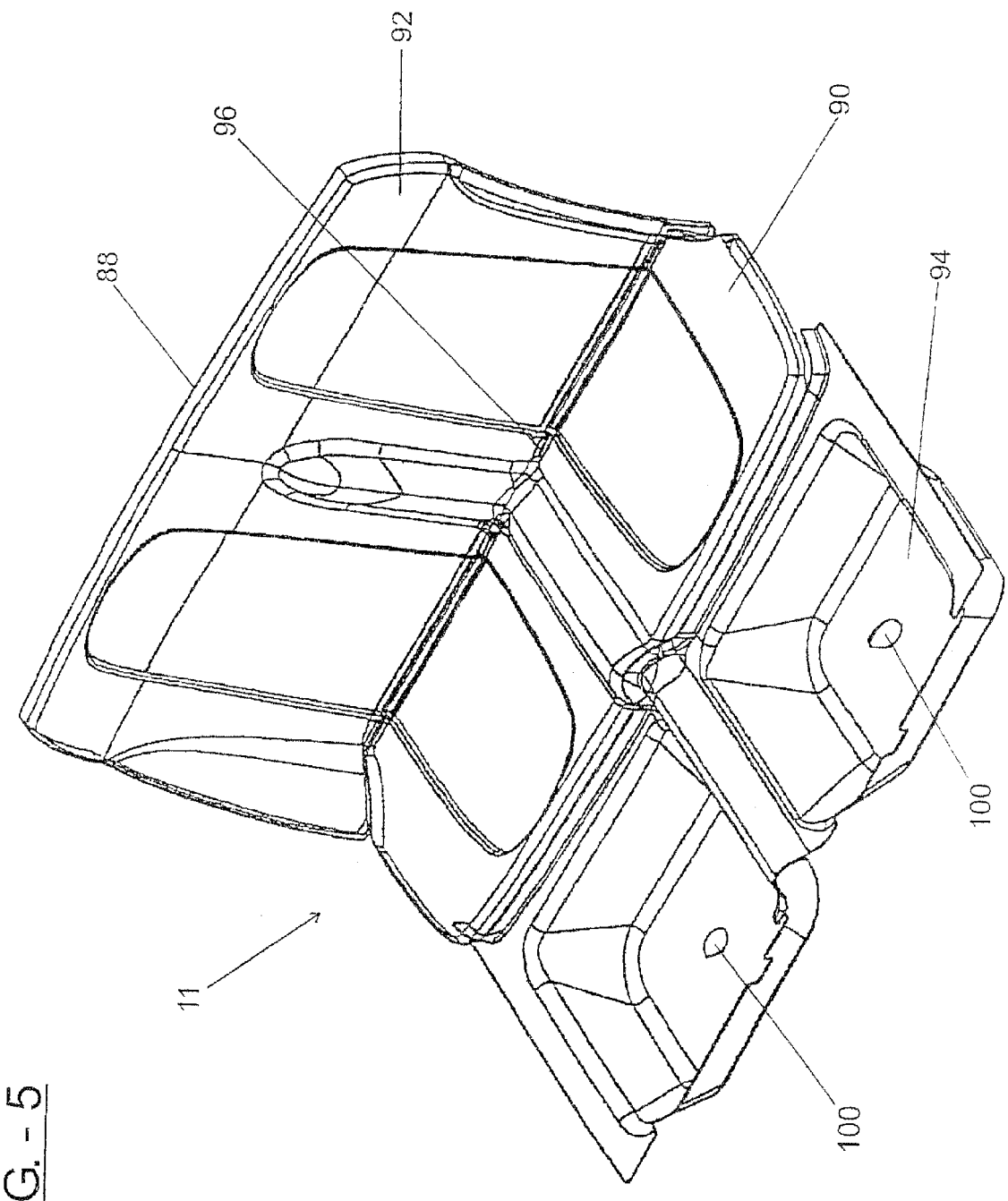
FIG. 5 is a perspective view of the rear seat replacement module of the present invention.
Figure 6:
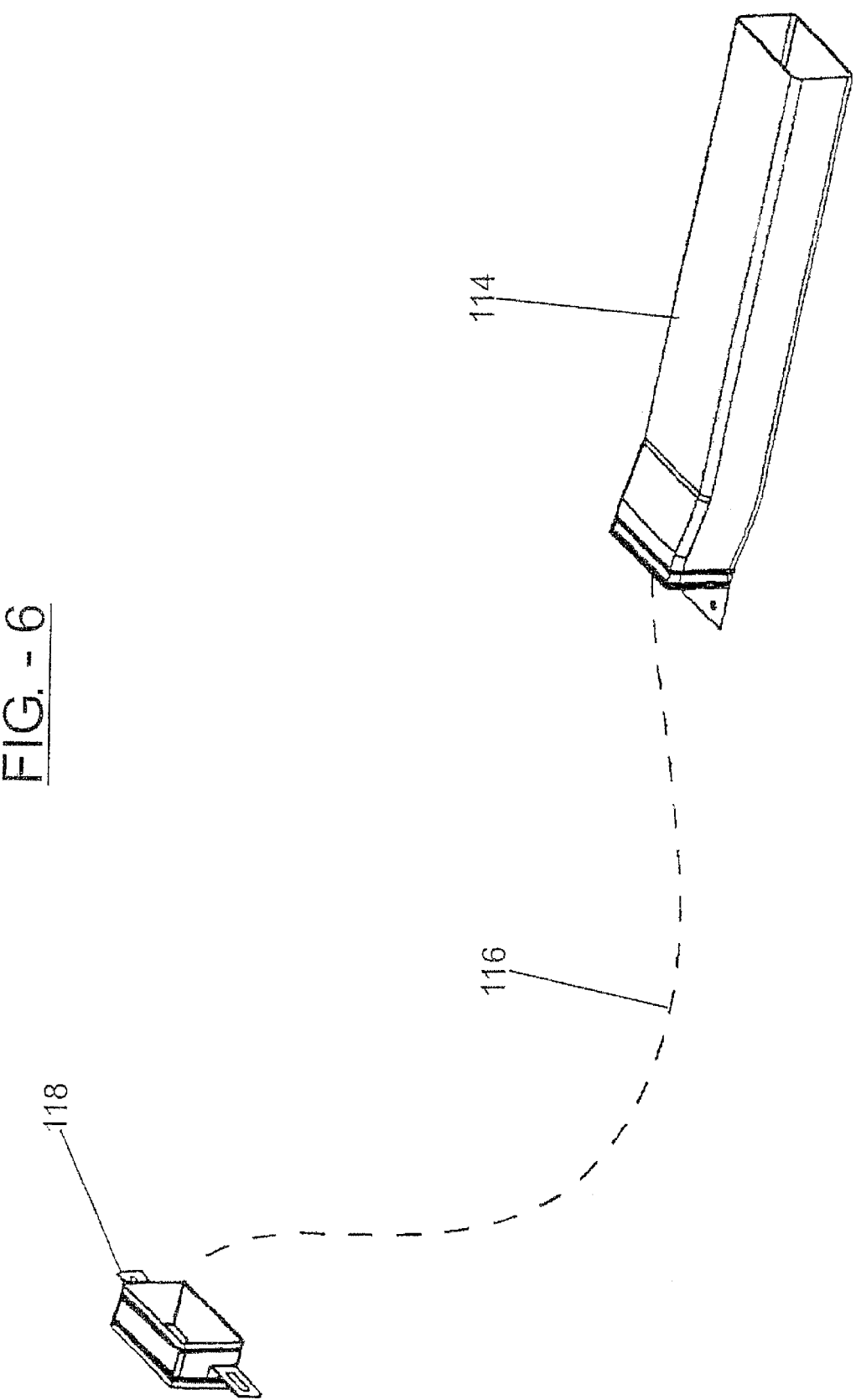
FIG. 6 is an alternate embodiment of the harness conduit of the present invention.

In certain circumstances, the shape and material of rear seat replacement module 88 as shown in FIG. 5 may inhibit easy routing of wire harness 152 through conduit 32 to the trunk area of vehicle 10. To facilitate routing of wire harness 152, conduit 32 may comprise a cloth section 116 as shown in FIG. 6 which conforms to the available space beneath rear set replacement module 88. Section 116 may be constructed of cloth or any other flexible, collapsible material that will fit under module 88. In this way, wire harness 152 may be routed through conduit 32 via a section 114 located on the center driveline area from the front seat area to the back seat area, then through cloth section 116 under seat module 88, and to the trunk area through a connector 118.

If the conversion system is designed for an emergency vehicle, such a vehicle may be used for transportation of detainees or patients, which may cause soiling of the vehicle. To facilitate such use, a rear seat replacement module 88 is included in the vehicle conversion system 11 as shown in FIG. 5. One or both sides of the standard rear seats (not shown) are preferably replaced by a rear seat replacement module 88. The rear seat replacement module 88 comprises a formed bench seat 90 on the left and/or right sides of the vehicle 10, each with a corresponding seat back 92 and a floor portion 94 in the shape of a sink. The module 88 preferably has knock-out sections 96 between the seat and seat back for the vehicle's standard seat belts 98 to pass through for regular use. The module 88 is easily cleaned and protects the rear seat area. A drain plug 100 may be provided to enable the cleaning water to drain from the module through existing holes in the vehicle. The attachment of the module is completed in a manner as to not deface visible surfaces of the rear seat cabin.

Figure 7:
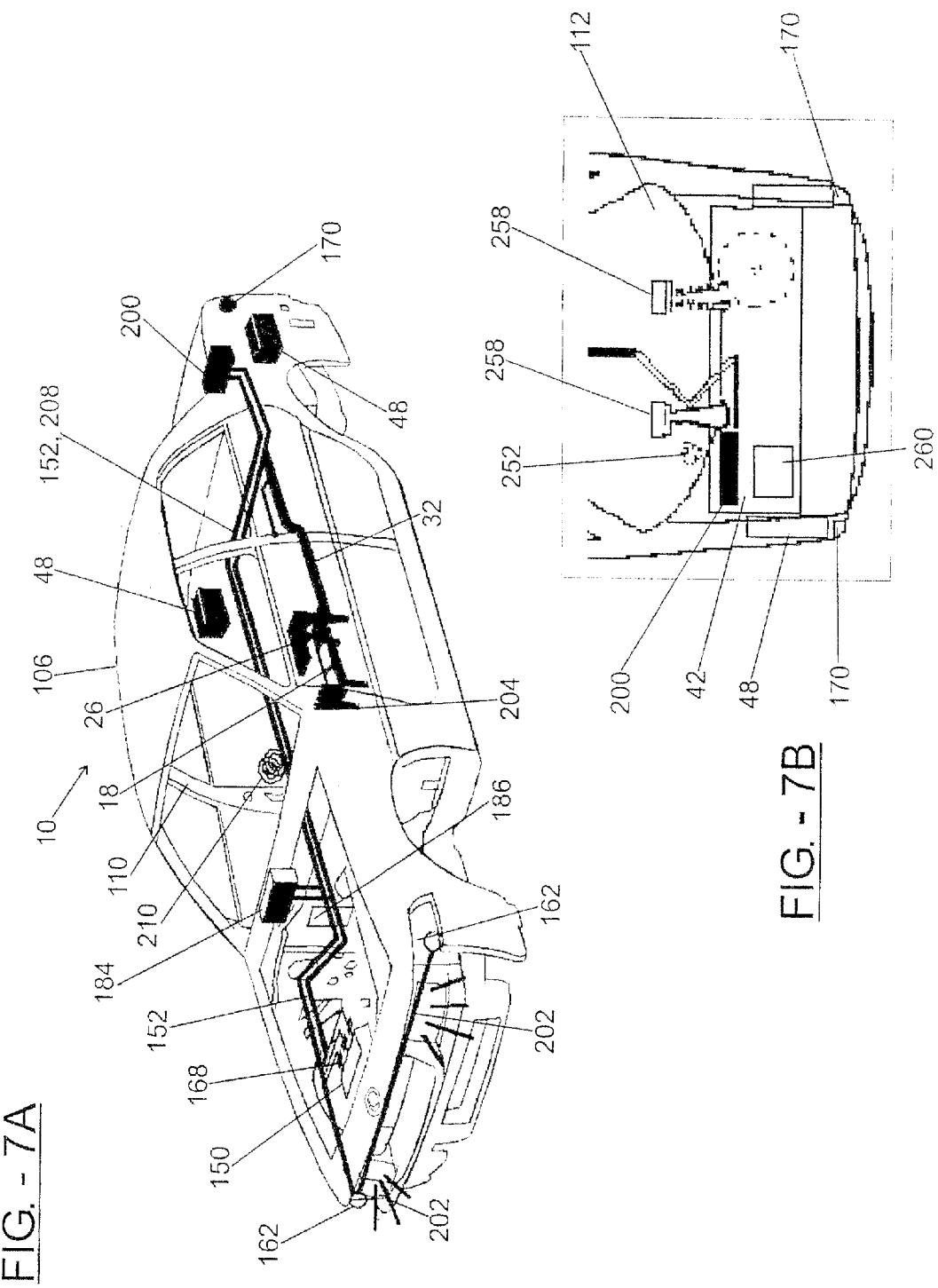
FIG. 7A is a perspective view of an embodiment of the present invention.
FIG. 7B is a top view of an alternate embodiment of the trunk system and ancillary equipment of the present invention.

In another embodiment, the conversion system of the present invention is as shown in FIGS. 7A and 7B. Referring now to FIG. 7A, independent wiring harness 152 runs along the passenger side of vehicle 10 in original equipment convolute tubing within the body wall of vehicle 10. Wiring harness 152 takes power from the existing vehicle battery 150 and distributes power to various points in the vehicle. Maxi fuses 168 restrict current draw from the battery to several circuits in the wiring harness 152. Two fuse/relay centers 184, 200 are provided, one at the glove box and another at the trunk. These fuse/relay centers provide battery and ignition controlled power to various add-on equipment that may be mounted to the conversion system or otherwise to vehicle. Such equipment may include but is not limited to video cameras and recorders, radios, sirens, scanners, computers, printers, radar guns, lighting units, antennas, control panels, electronics readouts, cellular phones, equipment compartments, gun locks, and various other accessories.

Connectivity of the independent wiring harness to various ancillary add-on equipment desired by a user of the converted vehicle will vary depending on the particular needs of the user. In one embodiment, the detailed wiring schematic is a shown in FIGS. 8–12.

Figure 8:
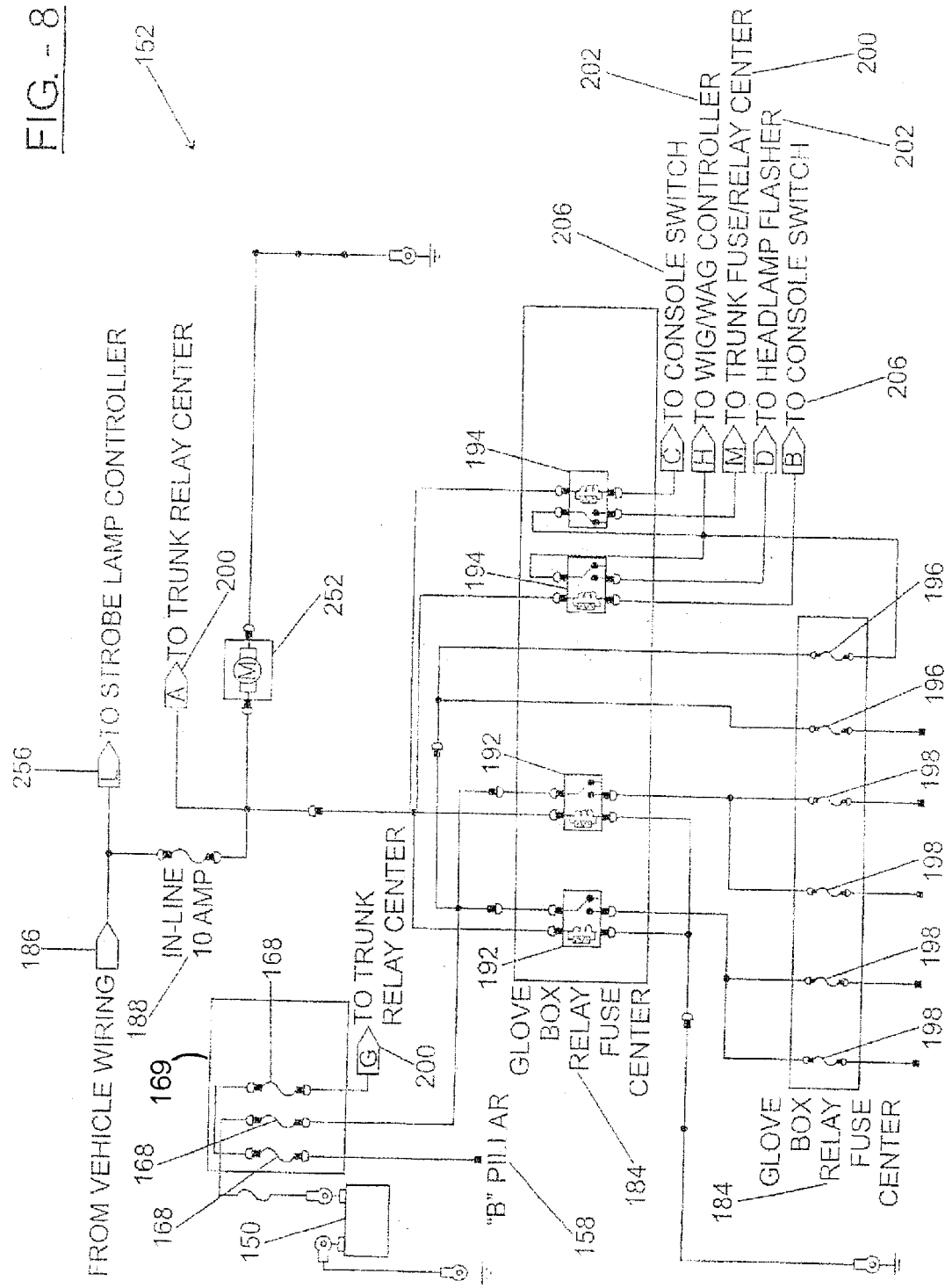
FIG. 8 is aspect of the wiring schematic of the independent wiring harness of the present invention.
Figure 9:
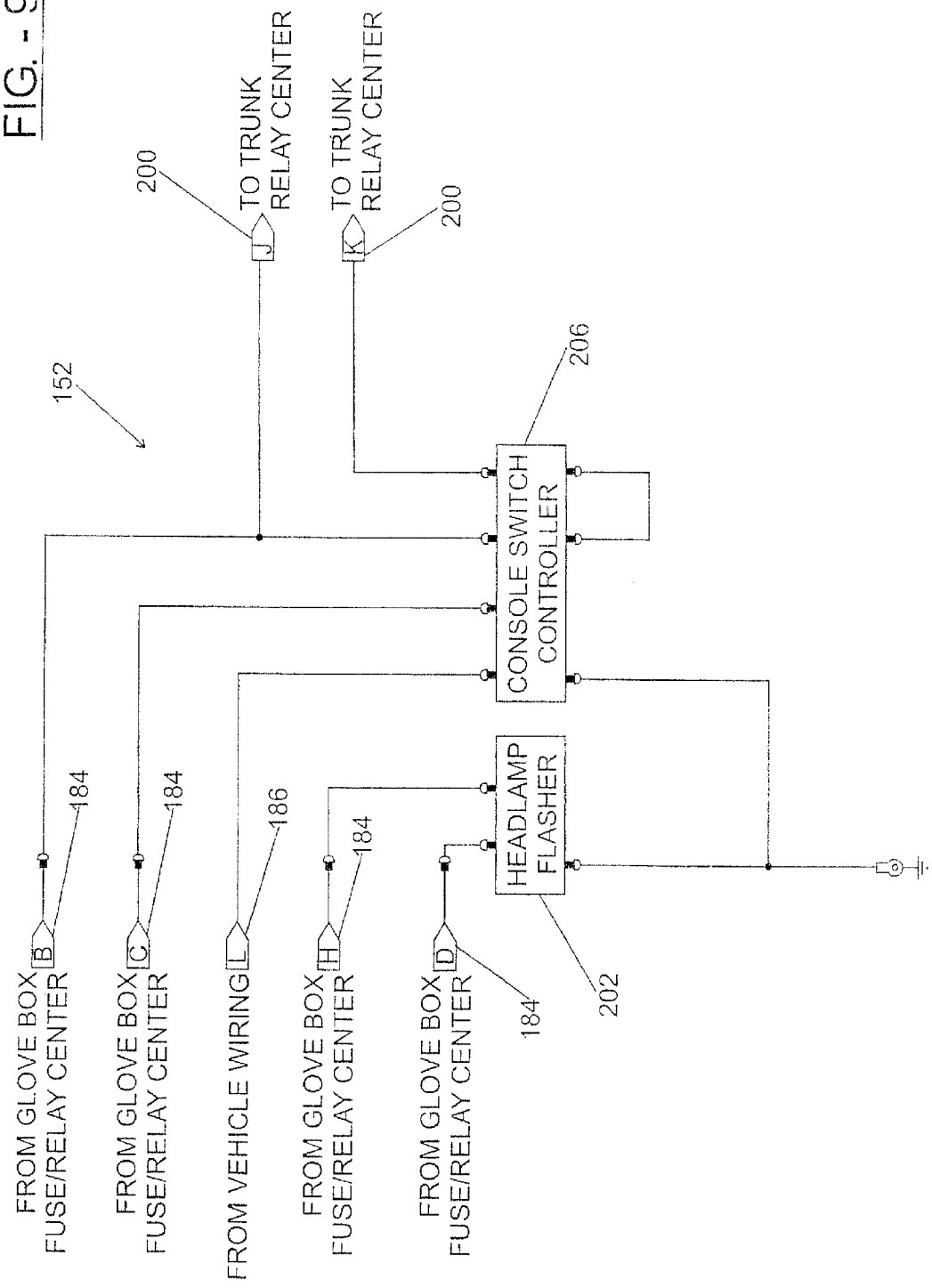
FIG. 9 is another aspect of the wiring schematic.
Figure 11:
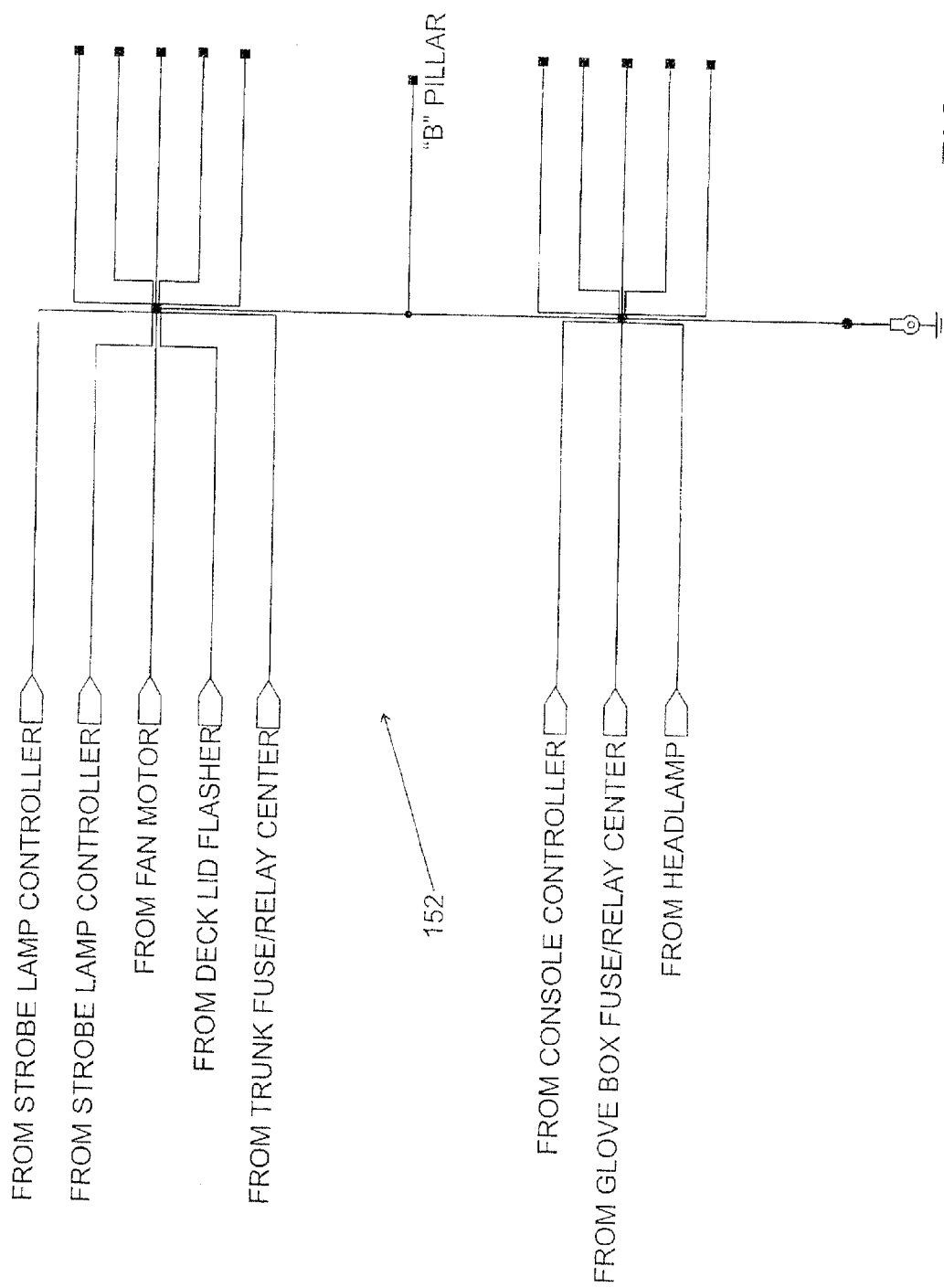
FIG. 11 is another aspect of the wiring schematic.
Figure 12:
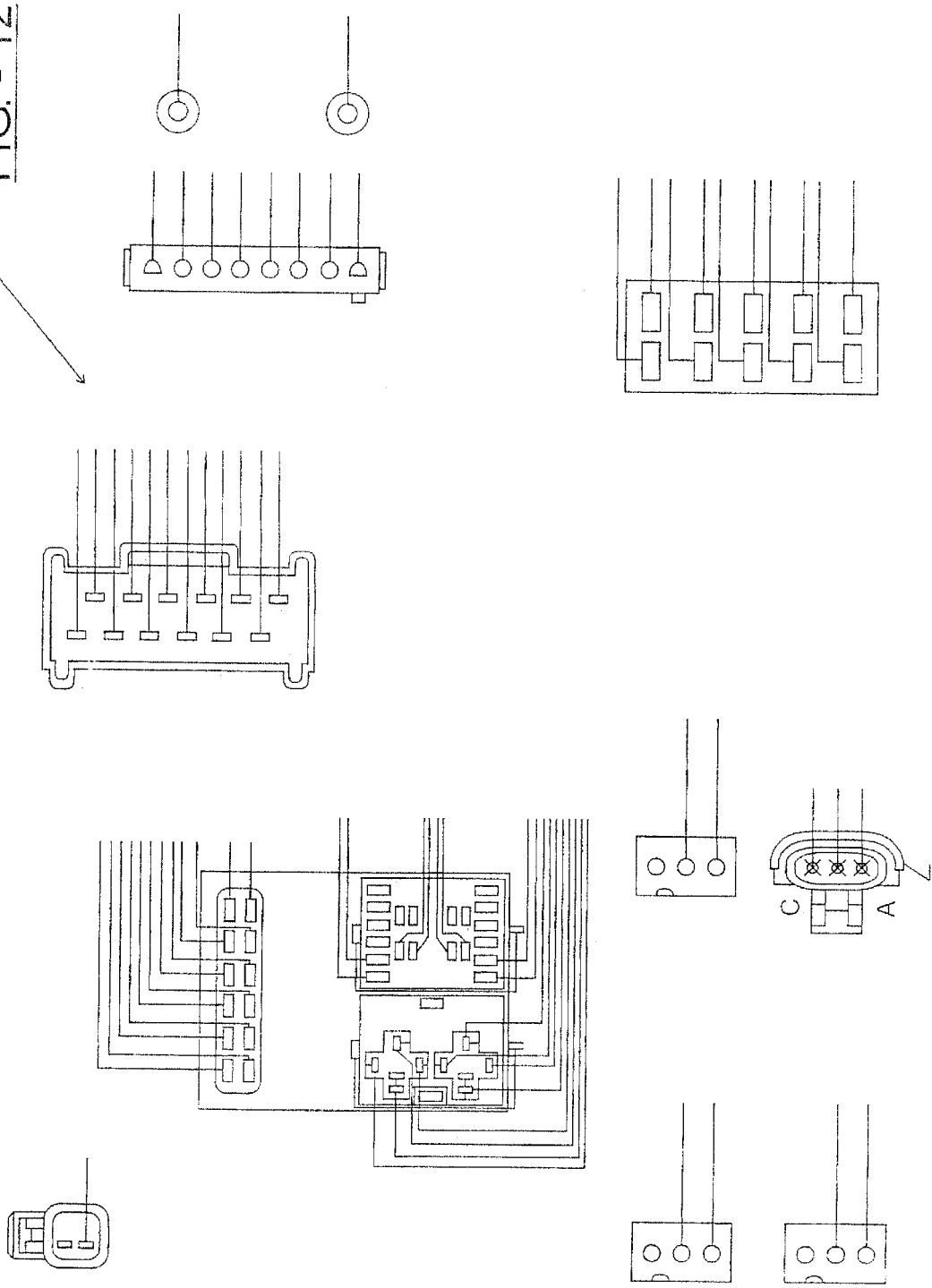
FIG. 12 is another aspect of the wiring schematic.

Referring now to FIG. 8, several aspects of wiring harness 152 are shown in detail. As will be appreciated by the skilled practitioner, wire harness 152 provides both battery and ignition controlled power as required by the various electrical appliances associated with vehicle 10. Electrical current supplied by battery 150 is regulated by maxi fuse 168, with connections to glove box relay/fuse center 184. Glove box relay/fuse center 184 includes two full relays 192 and two half relays 194 as shown in FIGS. 8, 14, 15, and 17. An ignition power trigger to activate the relays 192 and 194 is provided at the original equipment wiring 186 at the passenger kick panel. Power from the OEM wiring is regulated by an in-line fuse 188. Relays 192 and 194 thus provide ignition controlled power at fuses 198. Battery power is provided at fuses 196. Connections from half relays 194 are provided to console switches 206, wig wag/head lamp flasher controller 202, and trunk relay/fuse center 200 as indicated in FIGS. 8 and 9. Grounding of all glove box fuse/relay circuits are as indicated in FIGS. 11 and 16.

Figure 13:
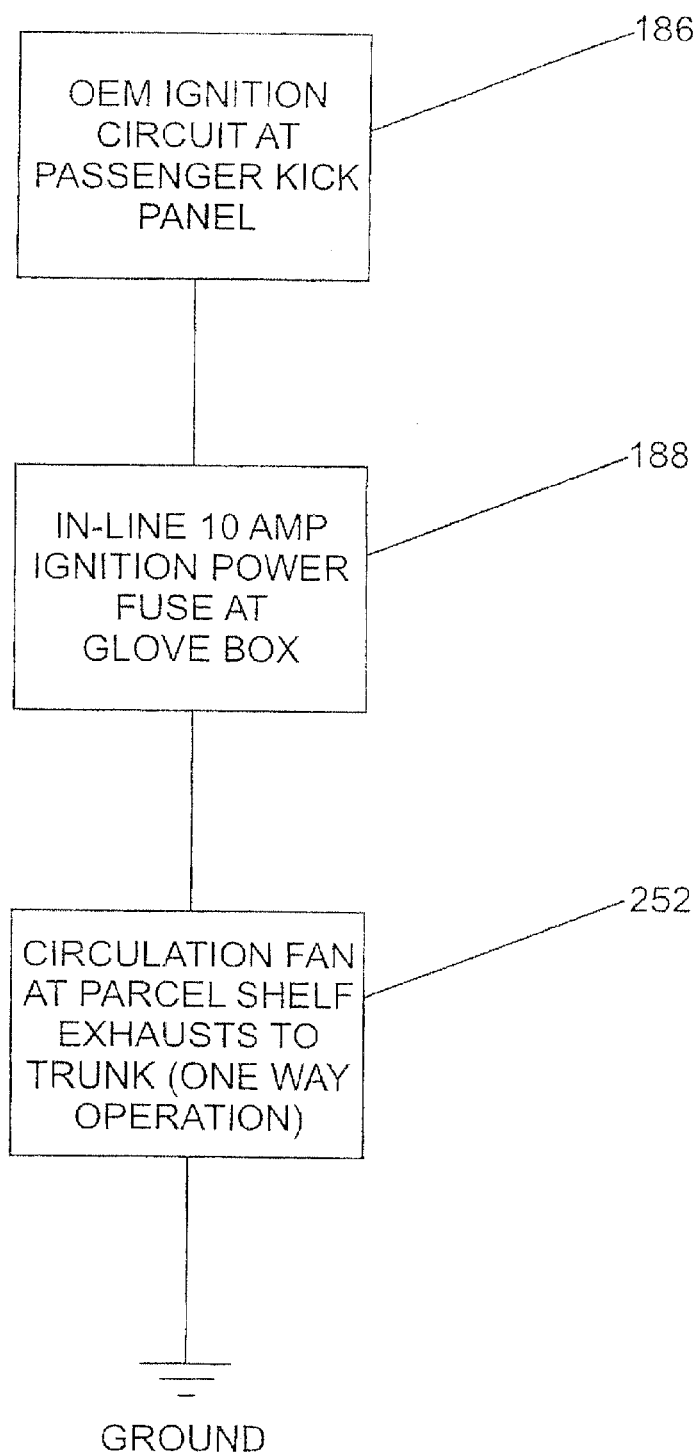
FIG. 13 is a simplified wiring schematic of the parcel shelf air circulation fan.
Figure 14:
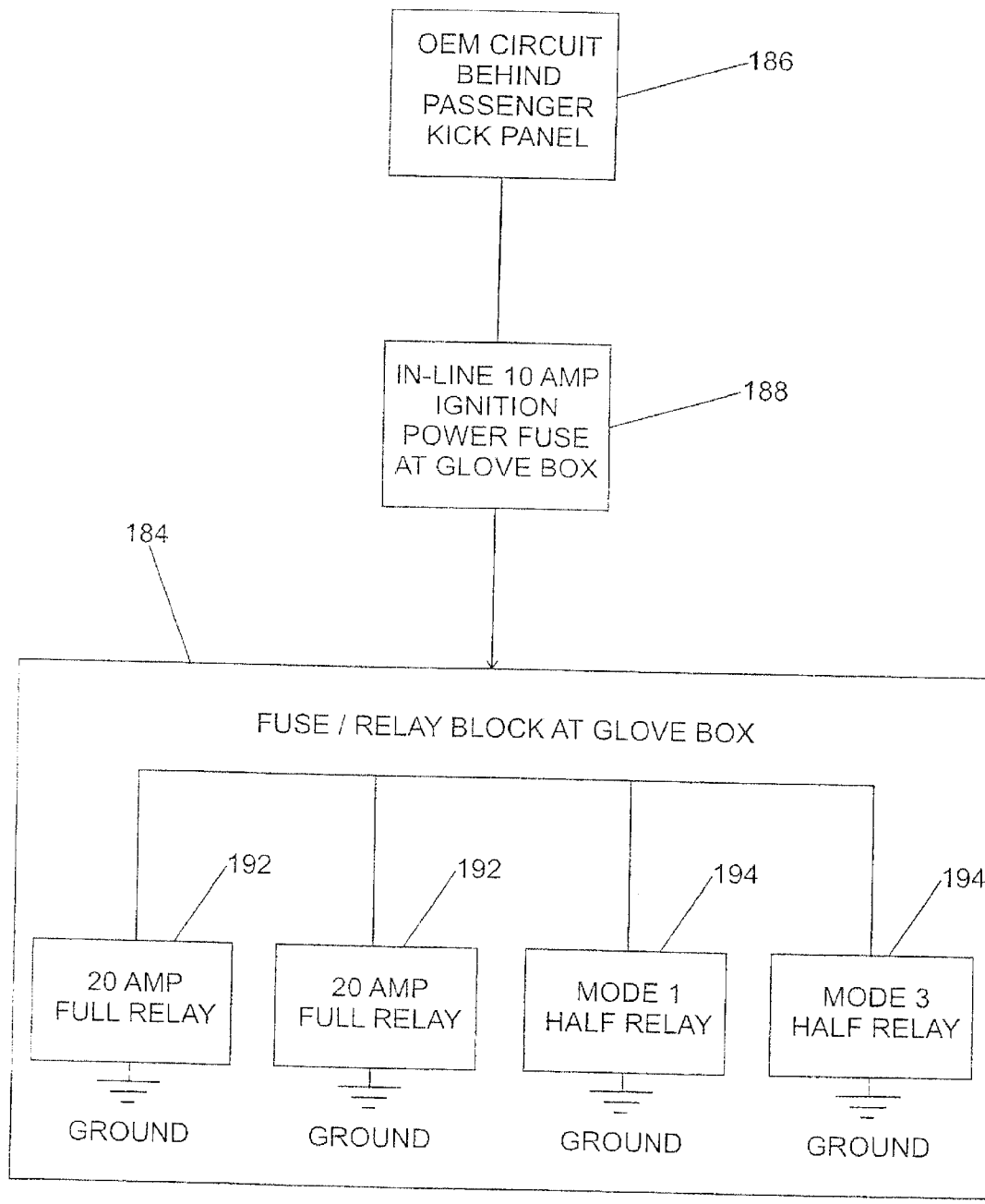
FIG. 14 is a simplified schematic of the ignition power trigger to the glove box relays.
Figure 15:
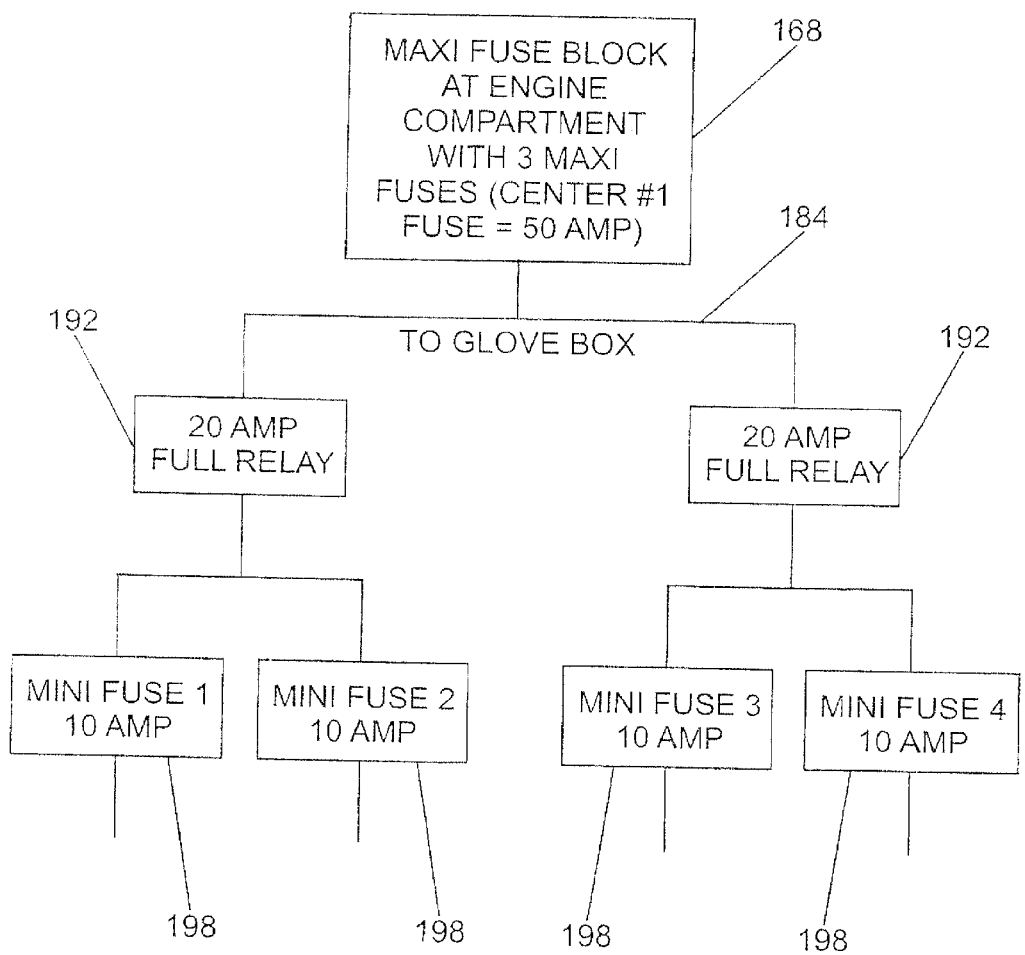
FIG. 15 is a simplified schematic of the ignition power from the glove box relays.
Figure 17:
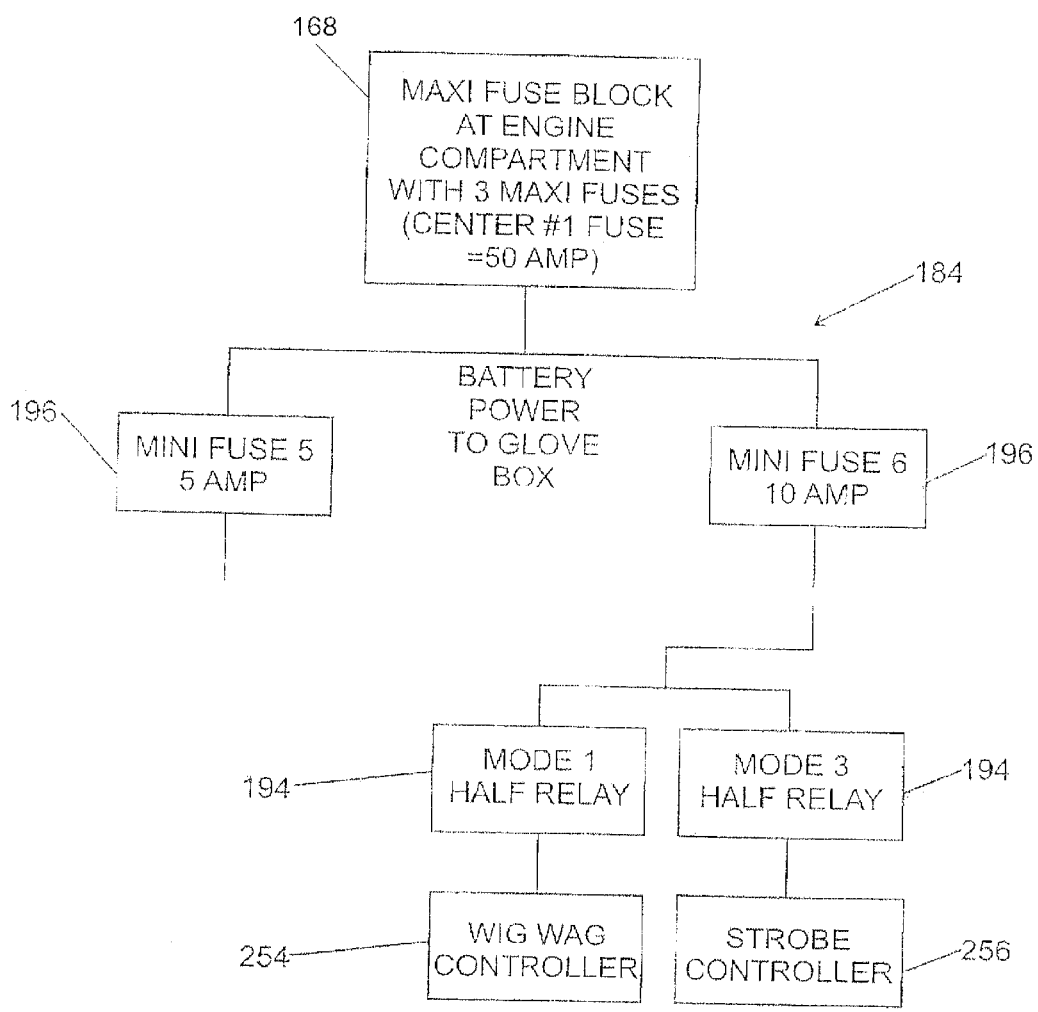
FIG. 17 is a simplified schematic of the battery power from the glove box fuse/relay center.
Figure 18:
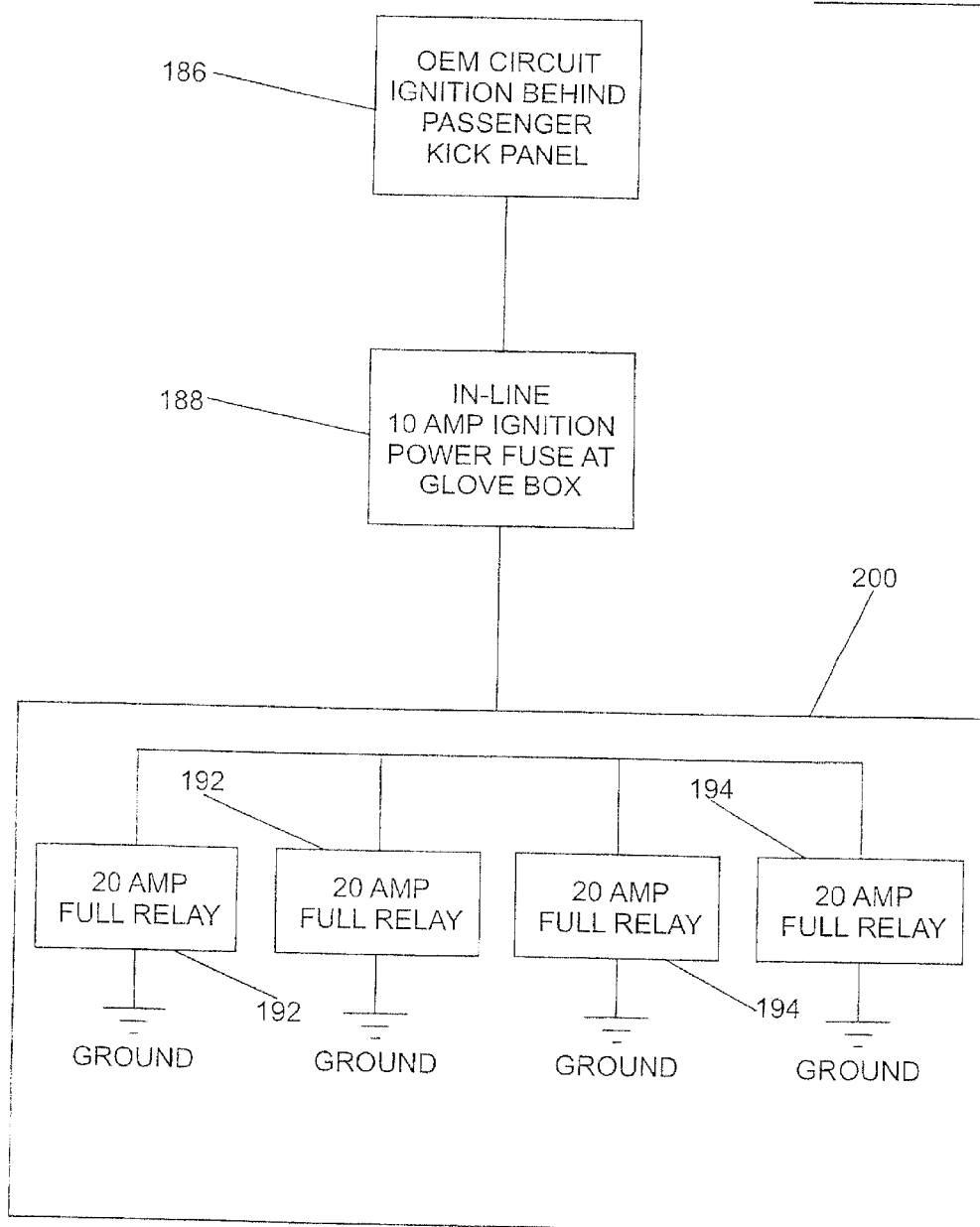
FIG. 18 is a simplified schematic of the ignition power trigger to the trunk relays.
Figure 19:
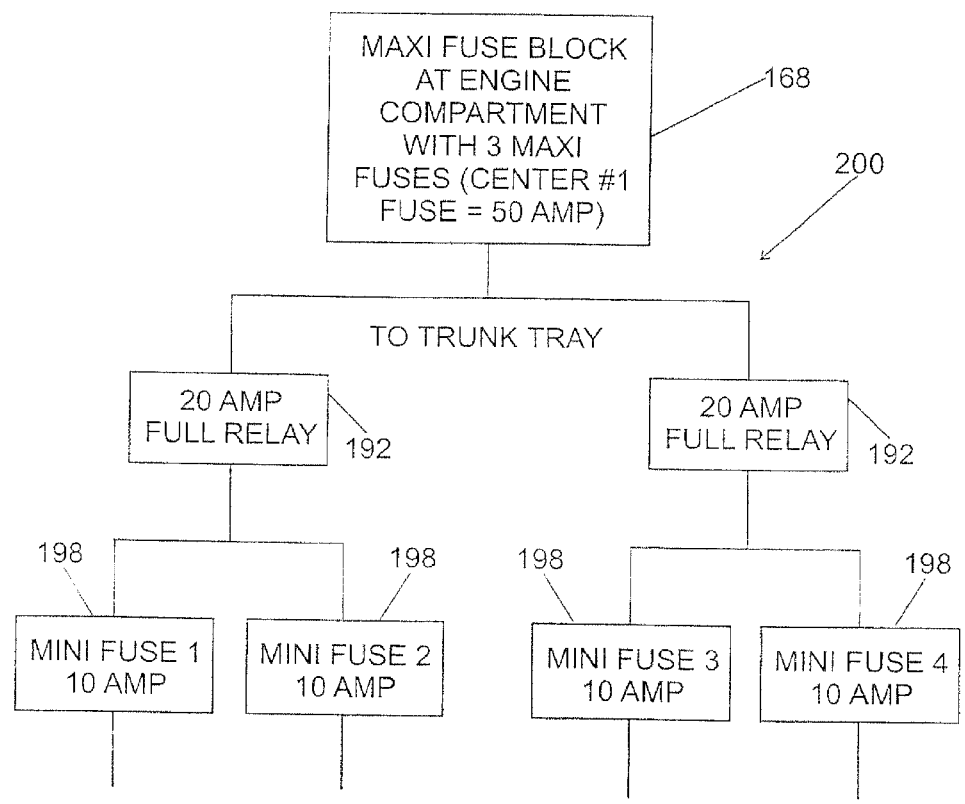
FIG. 19 is a simplified schematic of the ignition power from the trunk fuse/relay center.
Figure 20:
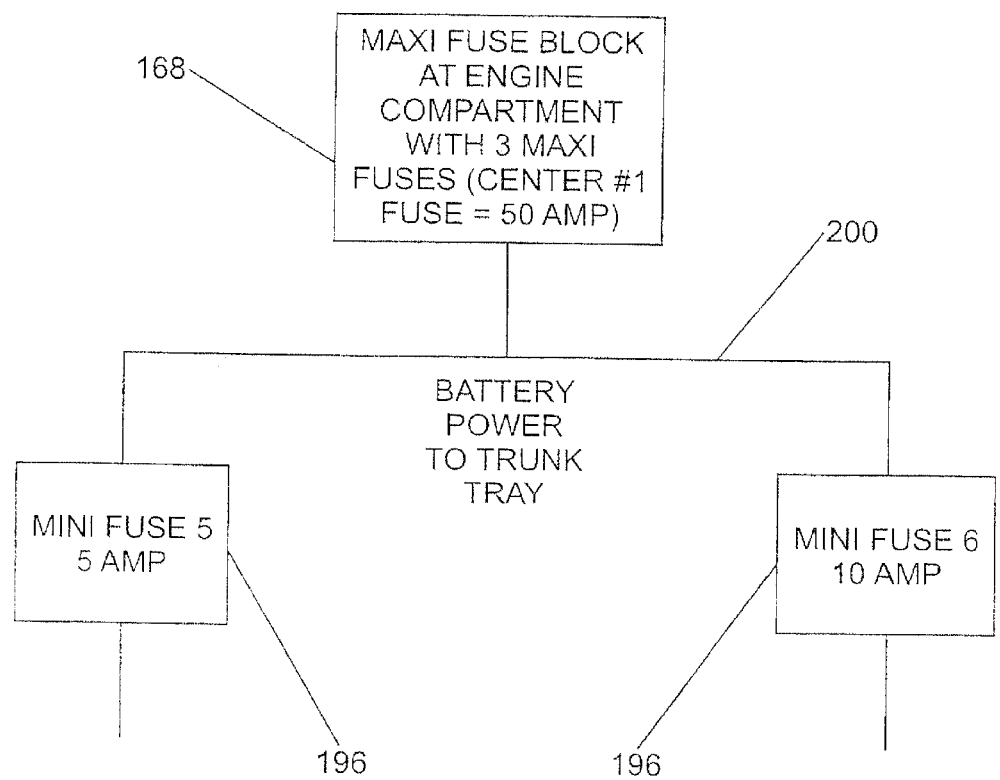
FIG. 20 is a simplified schematic of the battery power from the trunk fuse/relay center.

Ignition power from the OEM circuit 186 also provides power to strobe controller 256, trunk fuse/relay center 200 and fan 252. As indicated in FIGS. 8 and 13, OEM ignition circuit 186 at the passenger kick panel provides power through in-line fuse 188 to circulation fan 252 at the parcel shelf 112 of the vehicle 10. Circulation fan 252 provides one-way infusion of air from the passenger compartment to the trunk to provide conditioned air to protect moisture and heat-sensitive equipment mounted in the trunk compartment.

Figure 10:
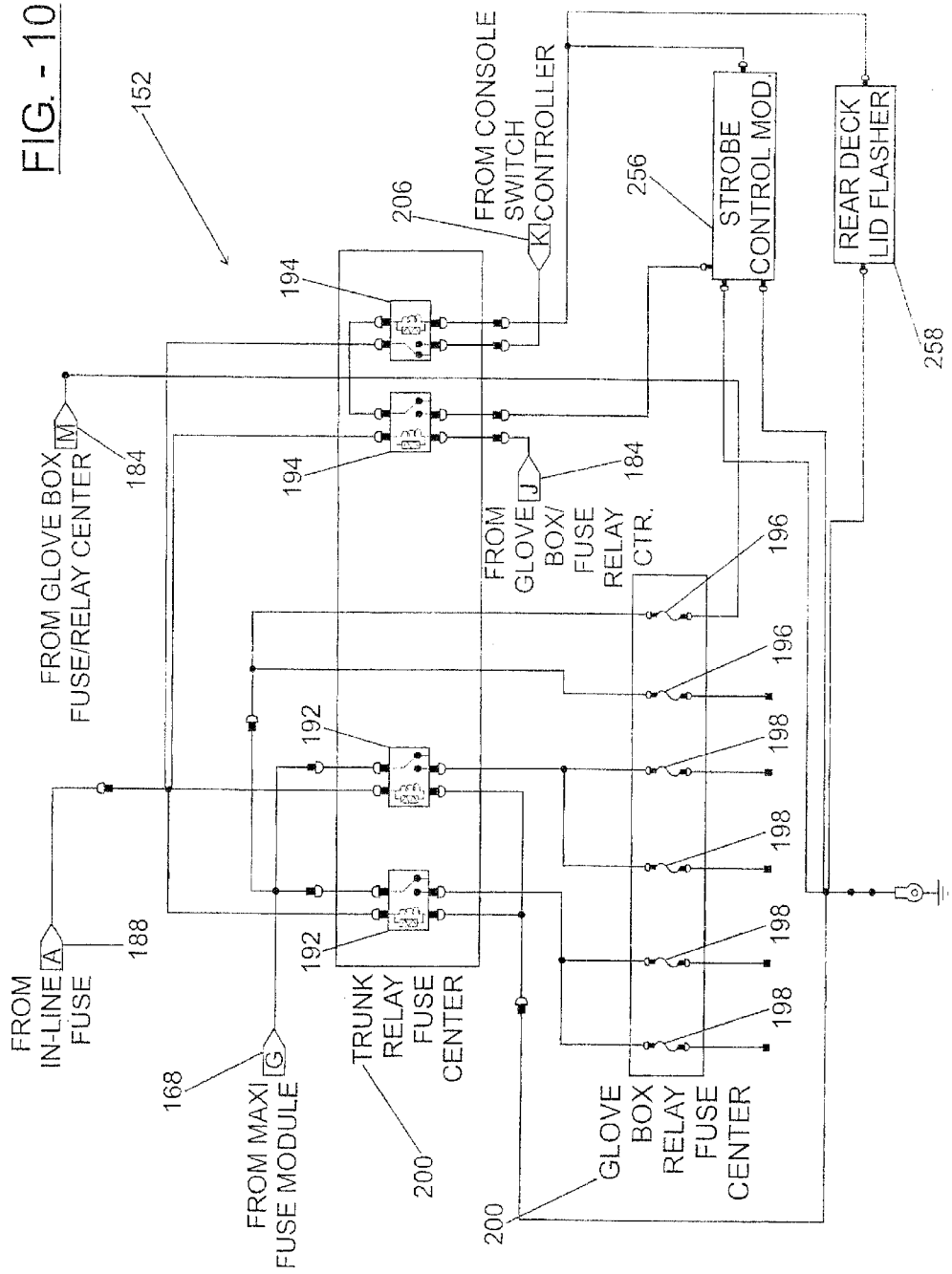
FIG. 10 is another aspect of the wiring schematic.

Referring now to FIG. 10, several further aspects of wiring harness 152 are shown in detail. Electrical current supplied by battery 150 is regulated by maxi fuse 168, with connections to trunk relay/fuse center 200. Similar to glove box relay/fuse center 184, trunk relay/fuse center 200 includes two full relays 192 and two half relays 194 as shown in FIGS. 10, 18, 19, and 20. An ignition power trigger to activate the relays 192 and 194 is provided at the original equipment wiring 186 at the passenger kick panel. Power from the OEM wiring is regulated by an in-line fuse 188. Relays 192 and 194 thus provide ignition controlled power at fuses 198. Battery power is provided at fuses 196. Connections from half relays 194 are provided to strobe controller 256 and rear deck lid flasher 258. Grounding of all trunk fuse/relay circuits are as indicated in FIGS. 11 and 21.

Figure 23:
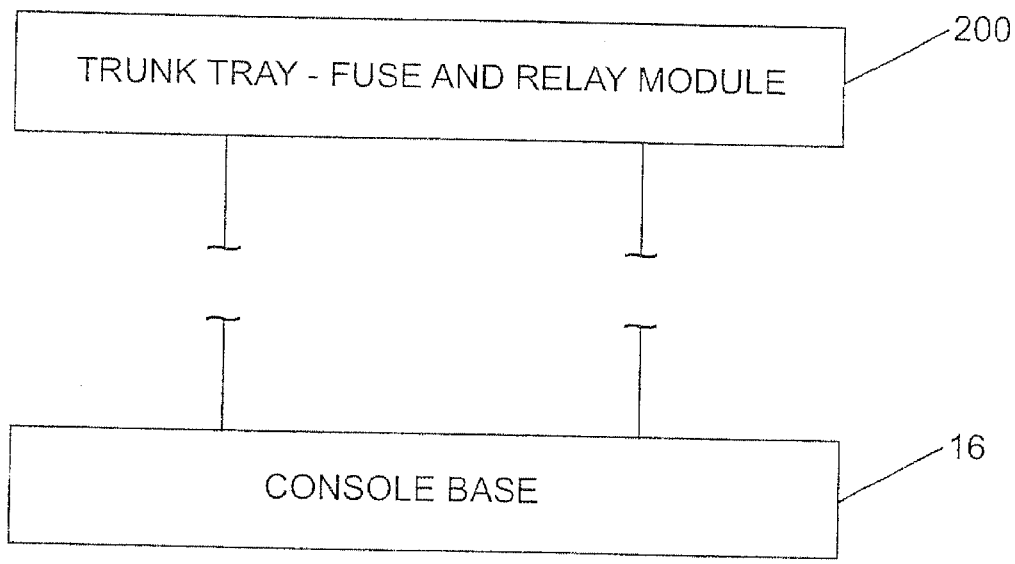
FIG. 23 is a simplified schematic of the extra circuits from the trunk fuse/relay center to the console.
Figure 24:
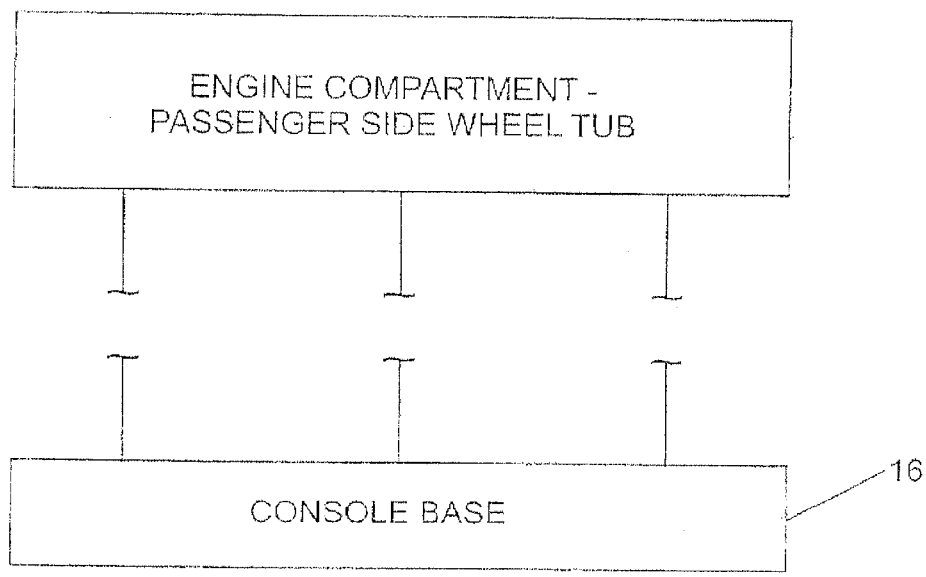
FIG. 24 is a simplified schematic of the extra OEM circuits from the engine compartment to the console.

Independent wiring harness 152 thus provides dual fuse/relay centers at the glove box and the trunk, as indicated in FIG. 22. Battery power from maxi fuses 168 in the main engine compartment is routed via wiring harness 152 to the dual fuse/relay centers 184 and 200 to provide battery and ignition power at the glove box and trunk simultaneously as previously described. Unused circuits from trunk tray fuse center 200 may be routed to console base 16 via conduit 32 as indicated in FIGS. 7A and 23. Additional unused OEM circuits from the engine compartment may be routed via the passenger side wheel tub to console base as indicated in FIGS. 7A and 24.

Figure 25:
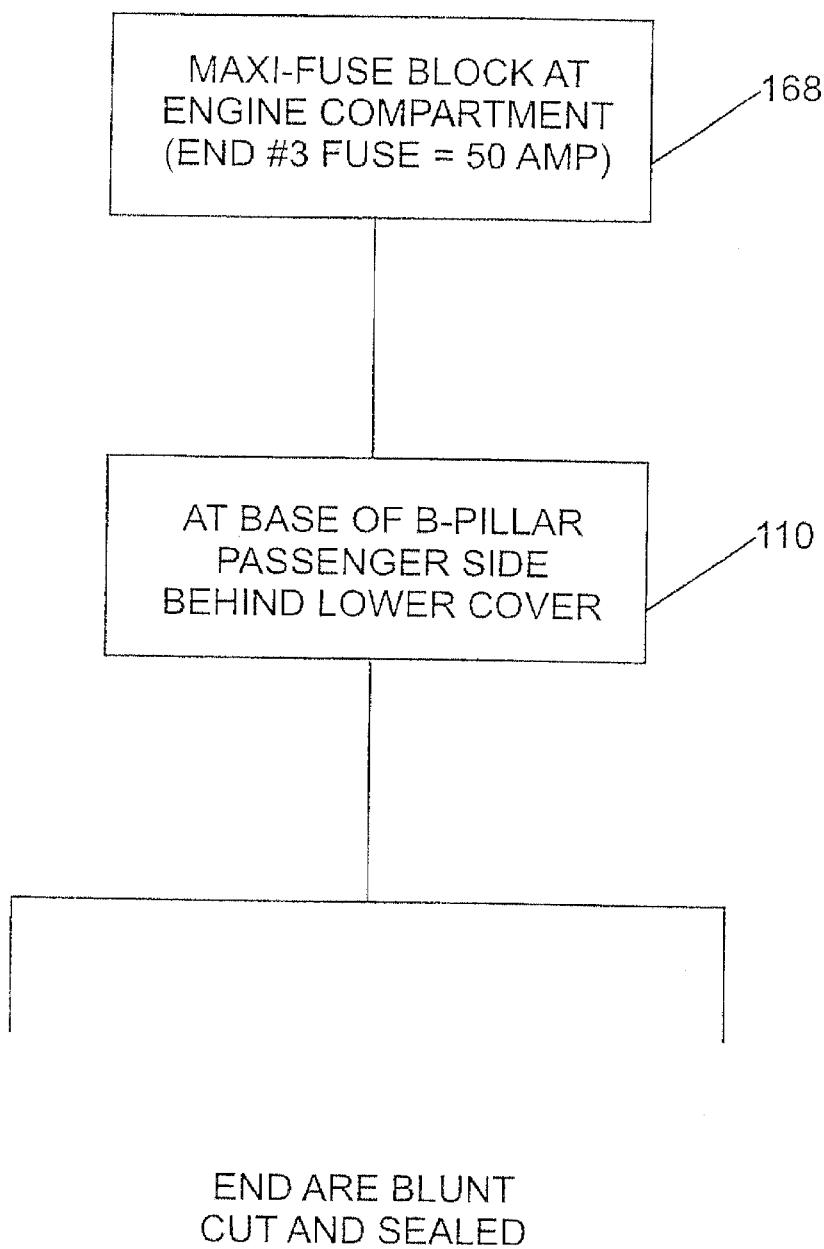
FIG. 25 is a simplified schematic of the B-pillar light circuit.

As shown in FIGS. 7A, 8 and 25, battery 150 provides power 158 to B-pillar light bar (not shown) mounted on the roof of vehicle 10. Power is supplied though maxi fuse 168 to B-pillar 110, with wire coil 210 supplied at the base of B-pillar 110. If connected to a roof light bar or other ancillary accessory, wire coil 210 may be extended through B-pillar 110 and through aperture 108 to connect power to the light.

As is apparent from FIGS. 5, 7A, and 7B, independent wiring harness 152 may be routed through conduit 32 or through existing, OEM convolute tubing to the fuse/relay centers and connections. Use of either of these two methods of routing the independent wiring harness 152 enables the conversion system 11 to be installed into an original equipment vehicle to convert it to a special purpose vehicle. If it is desired to revert the converted vehicle back to a non-special purpose vehicle, the conversion system 11 may be removed from the vehicle without defacing the vehicle or the OEM wiring harness. In the case of wiring harness 152 routed through OEM convolute tubing, such as that located along the passenger side of the vehicle, the wiring harness 152 may be simply disconnected from ancillary equipment that is subsequently removed, and the wiring harness 152 may be abandoned and left to remain unseen in the convolute.

Independent wiring harness 152 may be wholly or partly extended though conduit 32. In some cases, wires from trunk fuse/relay center 200 may be extended through conduit 32 from the trunk to console 16. Such connections may include console switches 206 to activate or deactivate various ancillary equipment such as strobes, flashers, or overhead lights, and may also include connections to other ancillary equipment located in the trunk such as radio transmitters, etc.

From the foregoing, it should be apparent that one or more of the conversion systems may be used to convert a vehicle for a desired special purpose. The systems allow conversion without significant alteration of the vehicles original equipment, allowing turn-key conversion of leased vehicles or subsequent re-conversion to the original equipment state for resale. While conversion of an original equipment vehicle to a special purpose police car has been described herein, use of the conversion system and its various parts including the independent wiring harness is not so limited. Any special purpose vehicle requiring ancillary add-on electrical equipment, interior modifications, etc. may be converted from an original equipment vehicle using the invention as described herein. Such special purpose vehicles may include but are not limited to police cars, fire cars, emergency rescue vehicles, ambulances, taxis, etc.

Although the present invention has been described above in detail, the same it by way of illustration and example only and is not to be taken as a limitation on the present invention. Accordingly, the scope and content of the present invention are to be defined only by the terms of the appended claims.

What is claimed is:

1. A conversion system for converting a vehicle from an original equipment vehicle to a special purpose use vehicle, the vehicle having a battery, said conversion system comprising:
   a wiring harness independent from a standard wiring harness supplied with said vehicle;
   wherein said conversion system is mountable to said vehicle without permanently defacing said vehicle, and said wiring harness is directly connected to the battery of said vehicle and to at least one piece of equipment.

2. The conversion system of claim 1, further comprising a conduit assembly, said conduit assembly comprising at least one conduit, said conduit having a plurality of wire ports, said wiring harness extending through said at least one conduit.

3. The conversion system of claim 1, further comprising a console, said console comprising a mounting support mountable to at least one seat stud of said vehicle.

4. The conversion system of claim 3, wherein said mounting support comprises a base plate having a plurality of apertures for attaching at least one of said at least one piece of equipment.

5. The conversion system of claim 1, further comprising a trunk compartment assembly mountable in the trunk of said vehicle.

6. The conversion system of claim 5, wherein said trunk compartment assembly comprises at least one frame on which at least one of said at least one piece of equipment can be secured.

7. The conversion system of claim 6, wherein said at least one frame comprises upper and lower frames, the upper frame and the lower frame being in fixed relationship to one another, the upper frame being horizontally spaced from the lower frame.

8. The conversion system of claim 5, wherein said trunk compartment assembly comprises at least one enclosed storage box.

9. The conversion system of claim 1, further comprising a barrier comprising a frame attachable to said vehicle using original equipment holes in the floor, roof or sides of said vehicle.

10. The conversion system of claim 9, wherein said barrier includes a bottom barrier shield half, and an upper shield half having a shelf; wherein said barrier separates said vehicle into a front interior passenger area and a rear interior passenger area and said shelf is accessible only from said interior front passenger area.

11. The conversion system of claim 10, wherein said shelf is a gun storage area utilizing a gun lock.

12. The conversion system of claim 1, further comprising a plurality of strobe lights connectable to at least one wire of said wiring harness.

13. The conversion system of claim 12, wherein said plurality of strobe lights comprises a rear strobe light system comprising a rear strobe light mounting plate, a rear strobe light cover, and at least one rear strobe light.

14. The conversion system of claim 1, further comprising at least one exterior mounting system comprising a base plate attached to said vehicle by means of fasteners without permanently defacing said vehicle.

15. The conversion system of claim 14, wherein said base plate is fastenable to a drip rail on both sides of said vehicle.

16. The conversion system of claim 14, wherein said base plate includes an electrical ground formed in association therewith.

17. The conversion system of claim 14, wherein said base plate supports at least one of said at least one piece of equipment, said at least one of said at least one piece of equipment connected to at least one wire of said wiring harness, said at least one wire extendable through a hole in a B pillar on either side of said vehicle.

18. The conversion system of claim 1, further comprising a rear seat replacement module mountable after removing the original rear seats of said vehicle.

19. The conversion system of claim 18, wherein said rear seat replacement module comprises a formed bench seat and a floor well cover.

20. The conversion system of claim 1, further comprising at least one air circulation fan capable of transferring air from the interior of said vehicle to the trunk of said vehicle.

21. The conversion system of claim 1, wherein at least one of said at least one conduit is an air conduit capable of carrying air from the interior of said vehicle to the trunk of said vehicle.

22. A method of converting a vehicle from an original equipment vehicle to a special purpose use vehicle, comprising the steps of:
mounting a conversion system to said vehicle without permanently defacing said vehicle, said conversion system comprising a wiring harness independent from a standard wiring harness supplied with said vehicle;
connecting said wiring harness directly to a battery of said vehicle;
attaching at least one piece of equipment to said conversion system; and connecting at least one of said at least one piece of equipment to said wiring harness.

23. The method of claim 22, said conversion system further comprising a conduit assembly, said conduit assembly comprising at least one conduit, said conduit having a plurality of wire ports, said wiring harness extending through said at least one conduit.

24. The method of claim 22, said conversion system further comprising a console, said console comprising a mounting support mountable to at least one seat stud of said vehicle.

25. The method of claim 24, wherein said mounting support comprises a base plate having a plurality of apertures for attaching at least one of said at least one piece of equipment.

26. The method of claim 22, wherein said conversion system further comprises a trunk compartment assembly mountable in the trunk of said vehicle.

27. The method of claim 26, wherein said trunk compartment assembly of said conversion system comprises at least one frame on which at least one of said at least one piece of equipment can be secured.

28. The method of claim 27, wherein said at least one frame comprises upper and lower frames, the upper frame and the lower frame being in fixed relationship to one another, the upper frame being horizontally spaced from the lower frame.

29. The method of claim 26, wherein said trunk compartment assembly comprises at least one enclosed storage box.

30. The method of claim 22, wherein said conversion system further comprises a barrier comprising a frame attachable to said vehicle using original equipment holes in the floor, roof or sides of said vehicle.

31. The method of claim 30, wherein said barrier includes a bottom barrier shield half, and an upper shield half having a shelf; wherein said barrier separates said vehicle into a front interior passenger area and a rear interior passenger area and said shelf is accessible only from said interior front passenger area.

32. The method of claim 31, wherein said shelf is a gun storage area utilizing a gun lock.

33. The method of claim 22, wherein said conversion system further comprises a plurality of strobe lights connectable to at least one wire of said wiring harness.

34. The method of claim 33, wherein said plurality of strobe lights comprises a rear strobe light system comprising a rear strobe light mounting plate, a rear strobe light cover, and at least one rear strobe light.

35. The method of claim 22, further comprising at least one exterior mounting system comprising a base plate attached to said vehicle by means of fasteners without permanently defacing said vehicle.

36. The method of claim 35, wherein said base plate is fastenable to a drip rail on both sides of said vehicle.

37. The method of claim 35, wherein said base plate includes an electrical ground formed in association therewith.

38. The method of claim 35, wherein said base plate supports at least one of said at least one piece of equipment, said at least one of said at least one piece of equipment connected to at least one wire of said wiring harness, said at least one wire extendable through a hole in a B pillar on either side of said vehicle.

39. The method of claim 22, wherein said conversion system further comprises a rear seat replacement module, and said mounting of said conversion system comprises removing original rear seats of said vehicle.

40. The method of claim 39, wherein said rear seat replacement module comprises a formed bench seat and a floor well cover.

41. The method of claim 22, wherein said conversion system further comprises at least one air circulation fan capable of transferring air from the interior of said vehicle to the trunk of said vehicle.

42. The method of claim 23, wherein at least one of said at least one conduit is an air conduit capable of carrying air from the interior of said vehicle to the trunk of said vehicle.

43. The conversion system of claim 1, wherein said wiring harness comprises at least one electrical distribution center.

44. The conversion system of claim 1, wherein said wiring harness comprises two electrical distribution centers.

45. The conversion system of claim 43, wherein said at least one electrical distribution center includes at least one fuse and at least one relay.

46. The conversion system of claim 43, wherein said at least one electrical distribution center provides both battery power and ignition controlled power connections.

47. The method of claim 22, wherein said wiring harness comprises at least one electrical distribution center.

48. The method of claim 22, wherein said wiring harness comprises two electrical distribution centers.

49. The method of claim 47, wherein said at least one electrical distribution center includes at least one fuse and at least one relay.

50. The method of claim 47, wherein said at least one electrical distribution center provides both battery power and ignition controlled power connections.

51. A conversion system for converting a vehicle from an original equipment vehicle to a special purpose use vehicle, said conversion system comprising:

a wiring harness independent from a standard wiring harness supplied with said vehicle, said wiring harness comprising at least one electrical distribution center, said at least one electrical distribution center having at least one of a fuse and a relay, said at least one electrical distribution center providing both battery power and ignition controlled power connections;

wherein said conversion system is mountable to said vehicle without permanently defacing said vehicle, and said wiring harness is connectable to a battery of said vehicle and to at least one piece of equipment, said conversion system further comprising:

a conduit assembly, said conduit assembly comprising at least one conduit, said conduit having a plurality of wire ports, said wiring harness extending through said at least one conduit;

a console, said console comprising a mounting support mountable to at least one seat stud of said vehicle;

a trunk compartment assembly mountable in the trunk of said vehicle, said trunk assembly comprising at least one storage box and at least one frame on which at least one of said at least one piece of equipment can be secured, said at least one frame comprising a slide tray;

a barrier and storage shelf assembly comprising a frame attachable to said vehicle using original equipment holes in the floor, roof or sides of said vehicle;

a plurality of strobe lights connectable to at least one wire of said wiring harness;

at least one exterior mounting system comprising a base plate attached to said vehicle by means of fasteners without permanently defacing said vehicle, said base plate supporting at least one of said at least one piece of equipment, said at least one of said at least one piece of equipment connected to at least one wire of said wiring harness, said at least one wire extendable through a hole in a B pillar on either side of said vehicle;

a rear seat replacement module mountable after removing the original rear seats of said vehicle, said rear seat replacement module comprising a formed bench seat and a floor well cover; and at least one air circulation fan capable of transferring air from the interior of said vehicle to the trunk of said vehicle, at least one of said at least one conduit is an air conduit capable of carrying air from the interior of said vehicle to the trunk of said vehicle.

52. A conversion system for converting a vehicle from an original equipment vehicle to a special purpose use vehicle, the vehicle having a battery, said conversion system comprising:

a wiring harness independent from a standard wiring harness supplied with said vehicle;

wherein said conversion system is mountable to said vehicle without permanently defacing said vehicle, and said wiring harness is directly connected to the battery of said vehicle and to at least one piece of equipment, the conversion system further comprising a plurality of modules removably attached to the vehicle, the plurality of modules including at least one of:

a conduit assembly, said conduit assembly comprising at least one conduit, said conduit having a plurality of wire ports, said wiring harness extending through said at least one conduit;

a trunk compartment assembly mountable in the trunk of said vehicle;

a barrier and storage shelf assembly comprising a frame attachable to said vehicle using original equipment holes in the floor, roof or sides of said vehicle;

a plurality of strobe lights connectable to at least one wire of said wiring harness;

at least one exterior mounting system comprising a base plate attached to said vehicle by means of fasteners without permanently defacing said vehicle; and a rear seat replacement module mountable after removing the original rear seats of said vehicle.

* * * * *